(12) United States Patent
Hashimoto et al.

(10) Patent No.: US 10,423,170 B2
(45) Date of Patent: Sep. 24, 2019

(54) MOTOR CONTROL DEVICE, MOTOR CONTROL METHOD, AND NON-TRANSITORY COMPUTER READABLE MEDIUM RECORDING A MOTOR CONTROL PROGRAM

(71) Applicant: FANUC CORPORATION, Yamanashi (JP)

(72) Inventors: Shoutarou Hashimoto, Yamanashi (JP); Tadashi Okita, Yamanashi (JP); Yuuki Morita, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 199 days.

(21) Appl. No.: 15/602,729

(22) Filed: May 23, 2017

(65) Prior Publication Data

US 2017/0344029 A1 Nov. 30, 2017

(30) Foreign Application Priority Data

May 25, 2016 (JP) .................................. 2016-104666

(51) Int. Cl.
*G05D 3/20* (2006.01)
*G05B 19/404* (2006.01)
(Continued)

(52) U.S. Cl.
CPC ............ *G05D 3/20* (2013.01); *G05B 19/0428* (2013.01); *G05B 19/416* (2013.01); *G05B 2219/43003* (2013.01)

(58) Field of Classification Search
CPC ..... G05D 3/20; G05B 19/404; G01D 5/24452
See application file for complete search history.

(56) References Cited

U.S. PATENT DOCUMENTS

2014/0062378 A1 3/2014 Iwashita et al.
2014/0197773 A1* 7/2014 Ikai ...................... G05B 19/404
                                                    318/630
(Continued)

FOREIGN PATENT DOCUMENTS

CN          1740754        3/2006
CN          101841286      9/2010
(Continued)

OTHER PUBLICATIONS

Office Action dated Jan. 2, 2019 in Chinese Patent Application No. 201710367667.9.
(Continued)

*Primary Examiner* — Bickey Dhakal
*Assistant Examiner* — Cortez M Cook
(74) *Attorney, Agent, or Firm* — Wenderoth, Lind & Ponack, L.L.P.

(57) ABSTRACT

Included are a first position detection part that detects a first position which is the position of a movable part; a second position detection part that detects a second position which is the position of a driven part; a positional error calculation part that calculates positional error, which is deviation between a converted first position detection value and a second position detection value; and a positional error variation calculation part that calculates an absolute value for variation of positional error since reversal of a position command was detected, in which addition of a backlash correction amount is started if the absolute value for the variation of the positional error exceeds a first reference value, and addition of a backlash acceleration amount is started if the absolute value of variation of the positional error exceeds a second reference value.

4 Claims, 14 Drawing Sheets

(51) Int. Cl.
  *G01D 5/244* (2006.01)
  *G05B 19/416* (2006.01)
  *G05B 19/042* (2006.01)

(56) References Cited

U.S. PATENT DOCUMENTS

2014/0366667 A1  12/2014  Cross et al.
2015/0309500 A1  10/2015  Hashimoto et al.

FOREIGN PATENT DOCUMENTS

| JP | 62-57003 | 3/1987 |
| JP | 4-8451 | 1/1992 |
| JP | 9-16258 | 1/1997 |
| JP | 2003-48136 | 2/2003 |
| JP | 2014-54001 | 3/2014 |
| JP | 2015-211498 | 11/2015 |
| WO | 2014/141515 | 9/2014 |

OTHER PUBLICATIONS

Office Action dated May 15, 2018 in Japanese Application No. 2016-104666.

* cited by examiner

FIG. 8A
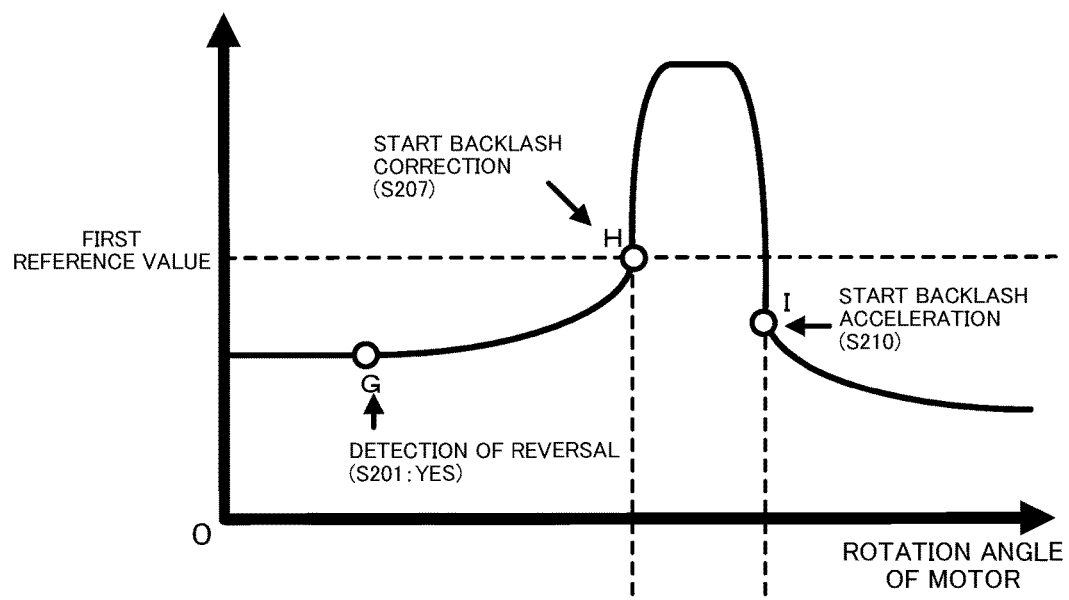
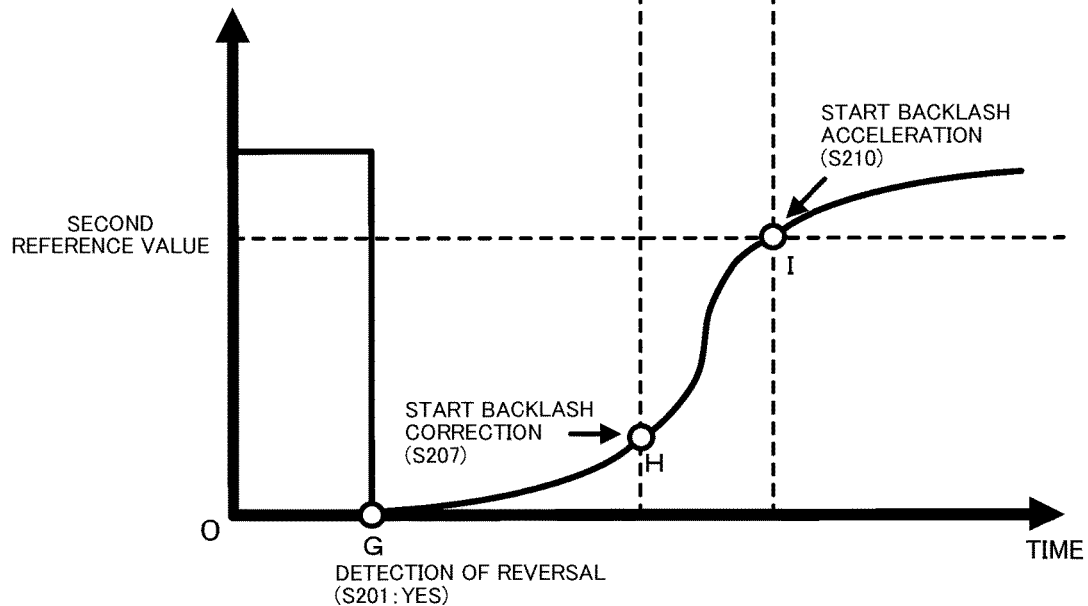
FIG. 8B

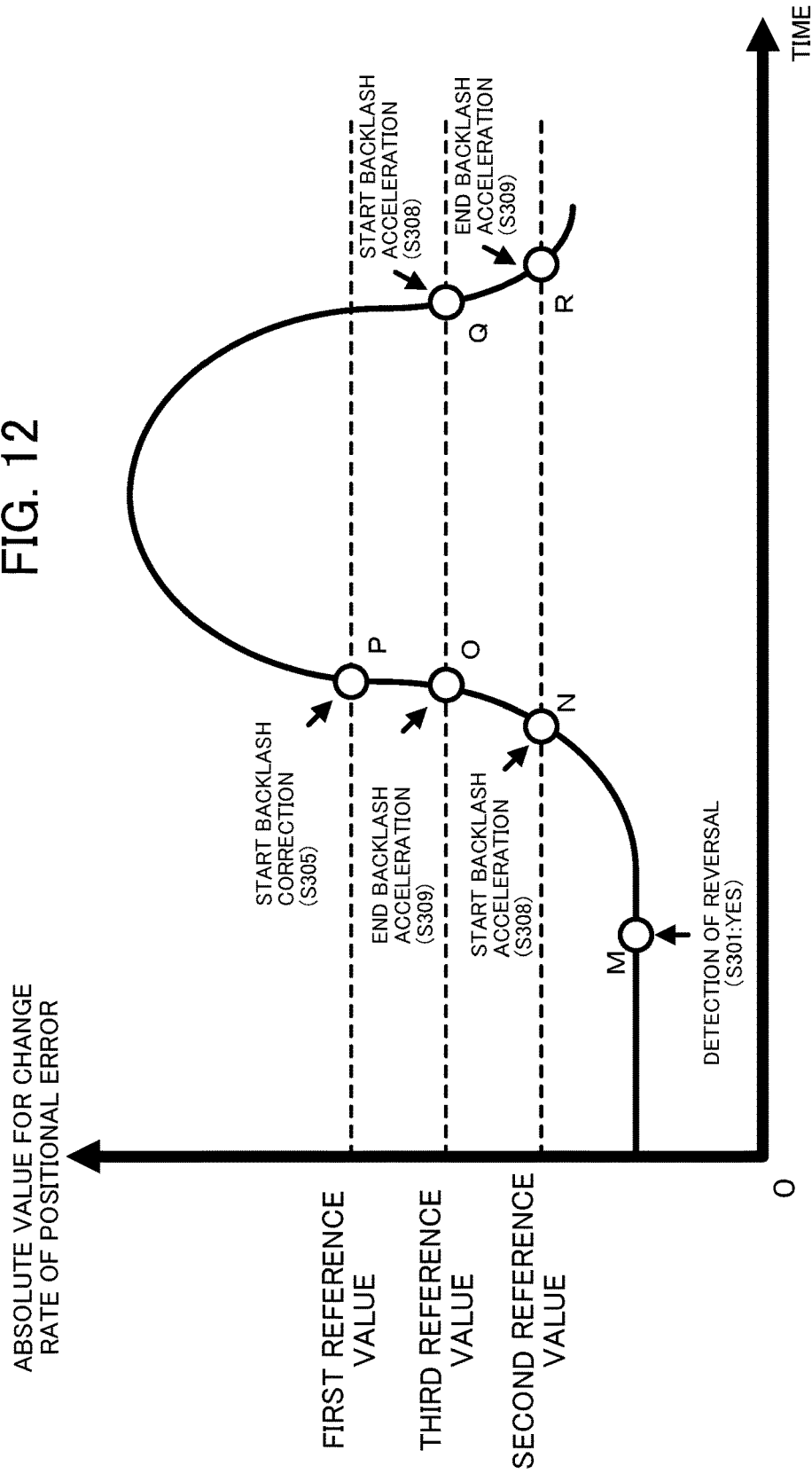

MOTOR CONTROL DEVICE, MOTOR CONTROL METHOD, AND NON-TRANSITORY COMPUTER READABLE MEDIUM RECORDING A MOTOR CONTROL PROGRAM

This application is based on and claims the benefit of priority from Japanese Patent Application No. 2016-104666, filed on 25 May 2016, the content of which is incorporated herein by reference.

BACKGROUND OF THE INVENTION

Field of the Invention

The present invention relates to a motor control device, motor control method, and non-transitory computer readable medium recording a motor control program, which have a means for adding a balance correction amount to a position command, and adding a backlash acceleration amount to a speed command or torque command, during motor reversal.

Related Art

Conventionally, in a control system with the position, orientation, posture, etc. of an object as controlled variables, for example, a control system of a machine tool or industrial machinery, servomotors have been used. For machine elements being used for conveying the rotation of the motor shaft of a servomotor to another main spindle, and joined together, a gap is intentionally provided at the mating surfaces between these machine elements. By way of this gap being present, machine elements such as screws and gears, for example, can rotate freely with a certain range. This gap is called "backlash".

For example, in the case of a motor and a driven shaft such as a spindle being joined by gears, due to the backlash of gears being present, when reversing the motor, the reversing of the driven shaft will be delayed relative to the reversing of the motor. In order to correct for the reversal delay of this driven shaft, there already exists a method of adding a backlash correction amount to a position command for the motor. This is called "backlash correction".

For example, as a method of improving the reversing behavior of a driven shaft during reversing of a motor, in a configuration having some kind of reduction mechanism between the motor and the driven shaft that is driven by this motor, Patent Document 1 discloses a method that gives a correction in the position for quickly moving by the amount of mechanical backlash possessed by the reduction mechanism, at the moment at which the motor reverses.

However, the method disclosed in Patent Document 1 is persistently a backlash correction method presuming that the reversal delay of the driven part occurs immediately from the backlash possessed by the reduction mechanism during at the time of the position command or reversal of the motor. On the other hand, in the case of gears and a belt being used simultaneously in the engagement between the motor and driven shaft, the reversal delay of the driven shaft delayed from reversal of the motor due to backlash of the gears may occur from the influence of the elasticity of the belt. In such a case, if adding the backlash correction amount immediately after reversal of the motor, there has been no effect of correction, or the correction negatively impacts the reversing operation of the driven shaft, as described later.

Therefore, the applicants have already filed an invention that adds a backlash correction amount at the timing at which gears move within spatial backlash (Japanese Patent Application No. 2016-080416).

Patent Document 1: Japanese Unexamined Patent Application, Publication No. 2014-054001
Patent Document 2: Japanese Unexamined Patent Application, Publication No. 2015-211498

SUMMARY OF THE INVENTION

On the other hand, in the case of a belt being used in the coupling between the motor and driven shaft, reversing of the driven shaft will be delayed relative to reversing of the motor due to the influences of elastic deformation of the belt and static friction of the driven shaft. In order to correct this reversal delay of the driven shaft, a method of adding correction not to a position command, but rather to a speed command or torque command upon motor reversal has existed conventionally. This is called "backlash acceleration".

In this regard, Patent Document 2 discloses a method of adding a backlash acceleration amount to the speed command or torque command. However, similarly to the invention according to Patent Document 1, the invention according to Patent Document 2 also is premised on the matter of reversal delay occurring immediately upon position command reversal or upon motor reversal. Actually, although Patent Document 2 is describing a method of setting the conditions for ending the addition of the backlash acceleration amount, the conditions for starting the addition of the backlash acceleration amount are in no way described therein.

The present invention has an object of providing a motor control device, a motor control method and a non-transitory computer readable medium recording a motor control program, which conduct the addition of a backlash correction mount to a position command for a motor, and the addition of a backlash acceleration amount to a speed command or torque command for the motor, at the appropriate timing.

According to a first aspect of the present invention, a first motor control device (for example, the motor control device 10 described later) is a motor control device for correcting backlash between a movable part (for example, the movable part 30 described later) that is driven by a motor, and a driven part (for example, the spindle 50 described later) that is driven by the movable part, the device including: a first position detection part (for example, the first position detection part 101 described later) that detects a first position which is a position of the movable part; a second position detection part (for example, the second position detection part 103 described later) that detects a second position which is a position of the driven part; a positional error calculation part (for example, the positional error calculation part 104 described later) that calculates positional error, which is deviation between a converted first position detected value arrived at by converting a first position detected value detected by the first position detection part into a value of a position of the driven part according to a rotation ratio between the movable part and the driven part; and a second position detected value detected by the second position detection part; a position command creation part (for example, the position command creation part 105 described later) that creates a position command; a reversal detection part (for example, the reversal detection part 106 described later) that detects reversal of the position command; a positional error variation calculation part (for example, the positional error variation calculation part 107 described later) that calculates an absolute value for variation of the positional error since reversal was detected; a determination part (for example, the determination part 108 described later) that determines whether the absolute value for the variation of the positional error has exceeded a predetermined reference value; a backlash correction part (for example, the backlash correction part 109 described later) that adds a backlash correction amount to the position command based on the positional error; a control unit (for example, the control unit 111 described later) that calculates a speed command or a torque command from a position command to which the backlash correction amount was added; and a backlash acceleration part (for example, the backlash acceleration part 112 described later) that adds a backlash acceleration amount to the speed command or the torque command, in which the backlash correction part starts addition of the backlash correction amount if an absolute value for variation of the positional error becomes at least a first reference value designated in advance, and the backlash acceleration part starts addition of the backlash acceleration amount if the absolute value for the variation of the positional error becomes at least a second reference value designated in advance.

According to a second aspect of the present invention, a second motor control device (for example, the motor control device 10A, described later) is a motor control device for correcting backlash between a movable part (for example, the movable part 30 described later) that is driven by a motor, and a driven part (for example, the spindle 50 described later) that is driven by the movable part, the device including: a first position detection part (for example, the first position detection part 101 described later) that detects a first position which is a position of the movable part; a second position detection part (for example, the second position detection part 103 described later) that detects a second position which is a position of the driven part; a positional error calculation part (for example, the positional error calculation part 104 described later) that calculates positional error, which is deviation between a converted first position detected value arrived at by converting a first position detected value detected by the first position detection part into a value of a position of the driven part according to a rotation ratio between the movable part and the driven part; and a second position detected value detected by the second position detection part; a position command creation part (for example, the position command creation part 105 described later) that creates a position command; a reversal detection part (for example, the reversal detection part 106 described later) that detects reversal of the position command; a positional error variation calculation part (for example, the positional error variation calculation part 107 described later) that calculates an absolute value for variation of the positional error since reversal was detected; a positional error change-rate calculation part (for example, the positional error change-rate calculation part 207 described later) that calculates an absolute value for a change rate of the positional error per unit time since reversal was detected; a first determination part (for example, the first determination part 208A described later) that determines whether the absolute value for the change rate of the positional error has exceeded a predetermined reference value; a second determination part (for example, the second determination part 208B described later) that determines whether the absolute value for the variation of the positional error has exceeded a predetermined reference value; a backlash correction part (for example, the backlash correction part 109 described later) that adds a backlash correction amount to the position command based on the positional error; a control unit (for example, the control unit 111 described later) that calculates a speed command or a torque command from a position command to which the backlash correction amount was added; and a backlash acceleration part (for example, the backlash acceleration part 112 described later) that adds a backlash acceleration amount to the speed command or the torque command, in which the backlash correction part starts addition of the backlash correction amount if the absolute value for the change rate of the positional error becomes at least a first reference value designated in advance, and the backlash acceleration part starts addition of the backlash acceleration amount if the absolute value for the variation of the positional error becomes at least a second reference value designated in advance.

According to a third aspect of the present invention, a third motor control device (for example, the motor control device 10A described later) is a motor control device for correcting backlash between a movable part (for example, the movable part 30 described later) that is driven by a motor, and a driven part (for example, the spindle 50 described later) that is driven by the movable part, the device including: a first position detection part (for example, the first position detection part 101 described later) that detects a first position which is a position of the movable part; a second position detection part (for example, the second position detection part 103 described later) that detects a second position which is a position of the driven part; a positional error calculation part (for example, the positional error calculation part 104 described later) that calculates positional error, which is deviation between a converted first position detected value arrived at by converting a first position detected value detected by the first position detection part into a value of a position of the driven part according to a rotation ratio between the movable part and the driven part; and a second position detected value detected by the second position detection part; a position command creation part (for example, the position command creation part 105 described later) that creates a position command; a reversal detection part (for example, the reversal detection part 106 described later) that detects reversal of the position command; a positional error variation calculation part (for example, the positional error variation calculation part 107 described later) that calculates an absolute value for variation of the positional error since reversal was detected; a positional error change-rate calculation part (for example, the positional error change-rate calculation part 207 described later) that calculates an absolute value for a change rate of the positional error per motor rotation angle unit variation since reversal was detected; a first determination part (for example, the first determination part 208A described later) that determines whether the absolute value for the change rate of the positional error has exceeded a predetermined reference value; a second determination part (for example, the second determination part 208B described later) that determines whether the absolute value for the variation of the positional error has exceeded a predetermined reference value; a backlash correction part (for example, the backlash correction part 109 described later) that adds a backlash correction amount to the position command based on the positional error; a control unit (for example, the control unit 111 described later) that calculates a speed command or a torque command from a position command to which the backlash correction amount was added; and a backlash acceleration part (for example, the backlash acceleration part 112 described later) that adds a backlash acceleration amount to the speed command or the torque command, in which the backlash correction part starts addition of the backlash correction amount if the absolute value for the change rate of the positional error exceeds a first reference value designated in advance, and the backlash acceleration part starts addition of the backlash acceleration amount if the absolute value for the variation of the positional error exceeds a second reference value designated in advance.

According to a fourth aspect of the present invention, a fourth motor control device (for example, the motor control device 10A described later) is a motor control device for correcting backlash between a movable part (for example, the movable part 30 described later) that is driven by a motor, and a driven part (for example, the spindle 50 described later) that is driven by the movable part, the device including: a first position detection part (for example, the first position detection part 101 described later) that detects a first position which is a position of the movable part; a second position detection part (for example, the second position detection part 103 described later) that detects a second position which is a position of the driven part; a positional error calculation part (for example, the positional error calculation part 104 described later) that calculates positional error, which is deviation between a converted first position detected value arrived at by converting a first position detected value detected by the first position detection part into a value of a position of the driven part according to a rotation ratio between the movable part and the driven part; and a second position detected value detected by the second position detection part; a position command creation part (for example, the position command creation part 105 described later) that creates a position command; a reversal detection part (for example, the reversal detection part 106 described later) that detects reversal of the position command; a positional error variation calculation part (for example, the positional error variation calculation part 107 described later) that calculates an absolute value for variation of the positional error since reversal was detected; a positional error change-rate calculation part (for example, the positional error change-rate calculation part 207 described later) that calculates an absolute value for a change rate of the positional error per unit variation of an integrated value of the position command since reversal was detected; a first determination part (for example, the first determination part 208A described later) that determines whether the absolute value for the change rate of the positional error has exceeded a predetermined reference value; a second determination part (for example, the second determination part 208B described later) that determines whether the absolute value for the variation of the positional error has exceeded a predetermined reference value; a backlash correction part (for example, the backlash correction part 109 described later) that adds a backlash correction amount to the position command based on the positional error; a control unit (for example, the control unit 111 described later) that calculates a speed command or a torque command from a position command to which the backlash correction amount was added; and a backlash acceleration part (for example, the backlash acceleration part 112 described later) that adds a backlash acceleration amount to the speed command or the torque command, in which the backlash correction part starts addition of the backlash correction amount if the absolute value for the change rate of the positional error becomes at least a first reference value designated in advance, and the backlash acceleration part starts addition of the backlash acceleration amount if the absolute value for the variation of the positional error becomes at least a second reference value designated in advance.

According to a fifth aspect of the present invention, a fifth motor control device (for example, the motor control device 10B described later) is a motor control device for correcting backlash between a movable part (for example, the movable part 30 described later) that is driven by a motor, and a driven part (for example, the spindle 50 described later) that is driven by the movable part, the device including: a first position detection part (for example, the first position detection part 101 described later) that detects a first position which is a position of the movable part; a second position detection part (for example, the second position detection part 103 described later) that detects a second position which is a position of the driven part; a positional error calculation part (for example, the positional error calculation part 104 described later) that calculates positional error, which is deviation between a converted first position detected value arrived at by converting a first position detected value detected by the first position detection part into a value of a position of the driven part according to a rotation ratio between the movable part and the driven part; and a second position detected value detected by the second position detection part; a position command creation part (for example, the position command creation part 105 described later) that creates a position command; a reversal detection part (for example, the reversal detection part 106 described later) that detects reversal of the position command; a positional error change-rate calculation part (for example, the positional error change-rate calculation part 207 described later) that calculates an absolute value for a change rate of the positional error per unit time since reversal was detected; a determination part (for example, the determination part 208C described later) that determines whether the absolute value for the change rate of the positional error has exceeded a predetermined reference value; a backlash correction part (for example, the backlash correction part 109 described later) that adds a backlash correction amount to the position command based on the positional error; a control unit (for example, the control unit 111 described later) that calculates a speed command or a torque command from a position command to which the backlash correction was added; and a backlash acceleration part (for example, the backlash acceleration part 112 described later) that adds a backlash acceleration amount to the speed command or the torque command, in which the backlash correction part starts addition of the backlash correction amount if an absolute value for the change rate of the positional error becomes at least a first reference value designated in advance, and the backlash acceleration part starts addition of the backlash acceleration amount if the absolute value for the change rate of the positional error becomes at least a second reference value designated in advance, and no more than a third reference value.

According to a sixth aspect of the present invention, in the motor control device as described in any one of the first to fifth aspects, the movable part driven by the motor and the driven part driven by the movable part may be mechanically joined by combination of gears and a belt.

According to a seventh aspect of the present invention, a first motor control method is a motor method for controlling a motor that corrects for backlash between a movable part that is driven by a motor and a driven part that is driven by the movable part, the method including the steps executed by a computer of: detecting a first position which is a position of the movable part; detecting a second position which is a position of the driven part; calculating a positional error which is a deviation between a converted first position detected value arrived at by converting a first position detected value that was detected in the step of detecting a first position into a value of a position of the driven part according to a rotation ratio between the movable part and the driven part, and a second position detected value that was detected in the step of detecting a second position; creating a position command; detecting reversal of the position command; calculating an absolute value for variation of the positional error since reversal was detected; determining whether the absolute value for the variation of the positional error has exceeded a predetermined reference value; adding a backlash correction amount to the position command based on the positional error; calculating a speed command or a torque command from a position command to which the backlash correction amount was added; and adding a backlash acceleration amount to the speed command or the torque command, in which addition of the backlash correction amount to the position command is started if the absolute value for the variation of the positional error exceeds a first reference value designated in advance, and addition of the backlash acceleration amount to the speed command or the torque command is started if the absolute value for the variation of the positional error exceeds a second reference value designated in advance.

According to an eighth aspect of the present invention, a second motor control method is a method for controlling a motor that corrects for backlash between a movable part that is driven by a motor and a driven part that is driven by the movable part, the method including the steps executed by a computer of: detecting a first position which is a position of the movable part; detecting a second position which is a position of the driven part; calculating a positional error which is a deviation between a converted first position detected value arrived at by converting a first position detected value that was detected in the step of detecting a first position into a value of a position of the driven part according to a rotation ratio between the movable part and the driven part, and a second position detected value that was detected in the step of detecting a second position; creating a position command; detecting reversal of the position command; calculating an absolute value for variation of the positional error since reversal was detected; calculating an absolute value for a change rate of the positional error per unit time since reversal was detected; determining whether the absolute value for the change rate of the positional error has exceeded a predetermined reference value; determining whether the absolute value for the variation of the positional error has exceeded a predetermined reference value; adding a backlash correction amount to the position command based on the positional error; calculating a speed command or a torque command from a position command to which the backlash correction amount was added; and adding a backlash acceleration amount to the speed command or the torque command, in which addition of the backlash correction amount to the position command is started if the absolute value for the change rate of the positional error exceeds a first reference value designated in advance, and addition of the backlash acceleration amount to the speed command or the torque command is started if the absolute value for the variation of the positional error exceeds a second reference value designated in advance.

According to a ninth aspect of the present invention, a third motor control method is a method for controlling a motor that corrects for backlash between a movable part that is driven by a motor and a driven part that is driven by the movable part, the method including the steps executed by a computer of: detecting a first position which is a position of the movable part; detecting a second position which is a position of the driven part; calculating a positional error which is a deviation between a converted first position detected value arrived at by converting a first position detected value that was detected in the step of detecting a first position into a value of a position of the driven part according to a rotation ratio between the movable part and the driven part, and a second position detected value that was detected in the step of detecting a second position; creating a position command; detecting reversal of the position command; calculating an absolute value for variation of the positional error since reversal was detected; calculating an absolute value for a change rate of the positional error per motor rotation angle unit variation since reversal was detected; determining whether the absolute value for the change rate of the positional error has exceeded a predetermined reference value; determining whether the absolute value for the variation of the positional error has exceeded a predetermined reference value; adding a backlash correction amount to the position command based on the positional error; calculating a speed command or a torque command from a position command to which the backlash correction amount was added; and adding a backlash acceleration amount to the speed command or the torque command, in which addition of the backlash correction amount to the positional error is started if the absolute value for the change rate of the positional error exceeds a first reference value designated in advance, and addition of the backlash acceleration amount to the speed command or the torque command is started if the absolute value for the variation of the positional error exceeds a second reference value designated in advance.

According to a tenth aspect of the present invention, a fourth motor control method is a method for controlling a motor that corrects for backlash between a movable part that is driven by a motor and a driven part that is driven by the movable part, the method including the steps executed by a computer of: detecting a first position which is a position of the movable part; detecting a second position which is a position of the driven part; calculating a positional error which is a deviation between a converted first position detected value arrived at by converting a first position detected value that was detected in the step of detecting a first position into a value of a position of the driven part according to a rotation ratio between the movable part and the driven part, and a second position detected value that was detected in the step of detecting a second position; creating a position command; detecting reversal of the position command; calculating an absolute value for variation of the positional error since reversal was detected; calculating an absolute value for a change rate of the positional error per unit variation of an integral value of the position command since reversal was detected; determining whether the absolute value for the change rate of the positional error has exceeded a predetermined reference value; determining whether the absolute value for the variation of the positional error has exceeded a predetermined reference value; adding a backlash correction amount to the position command based on the positional error; calculating a speed command or a torque command from a position command to which the backlash correction amount was added; and adding a backlash acceleration amount to the speed command or the torque command, in which addition of the backlash correction amount to the position command is started if the absolute value for the change rate of the positional error exceeds a first reference value designated in advance, and addition of the backlash acceleration amount to the speed command or the torque command is started if the absolute value for the variation of the positional error exceeds a second reference value designated in advance.

According to an eleventh aspect of the present invention, a fifth motor control method is a method for controlling a motor that corrects for backlash between a movable part that is driven by a motor and a driven part that is driven by the movable part, the method including the steps executed by a computer of: detecting a first position which is a position of the movable part; detecting a second position which is a position of the driven part; calculating a positional error which is a deviation between a converted first position detected value arrived at by converting a first position detected value that was detected in the step of detecting a first position into a value of a position of the driven part according to a rotation ratio between the movable part and the driven part, and a second position detected value that was detected in the step of detecting a second position; creating a position command; detecting reversal of the position command; calculating an absolute value for a change rate of the positional error per unit time since reversal was detected; determining whether the absolute value for the change rate of the positional error has exceeded a predetermined reference value; adding a backlash correction amount to the position command based on the positional error; calculating a speed command or a torque command from a position command to which the backlash correction amount was added; and adding a backlash acceleration amount to the speed command or the torque command, in which addition of the backlash correction amount to the position command is started if the absolute value for the change rate of the positional error exceeds a first reference value designated in advance, and addition of the backlash acceleration amount to the speed command or the torque command is started if the absolute value for the change of the positional error is less than a third reference value at the same time as exceeding a second reference value designated in advance.

According to a twelfth aspect of the present invention, a first non-transitory computer readable medium is a non-transitory computer readable medium recording a motor control program for correcting backlash between a movable part that is driven by a motor and a driven part that is driven by the movable part, the program enabling a computer to execute the steps of: detecting a first position which is a position of the movable part; detecting a second position which is a position of the driven part; calculating a positional error which is a deviation between a converted first position detected value arrived at by converting a first position detected value that was detected in the step of detecting a first position into a value of a position of the driven part according to a rotation ratio between the movable part and the driven part, and a second position detected value that was detected in the step of detecting a second position; creating a position command; detecting reversal of the position command; calculating an absolute value for variation of the positional error since reversal was detected; determining whether the absolute value for the variation of the positional error has exceeded a predetermined reference value; adding a backlash correction amount to the position command based on the positional error; calculating a speed command or a torque command from a position command to which the backlash correction amount was added; and adding a backlash acceleration amount to the speed command or the torque command, in which addition of the backlash correction amount to the position command is started if the absolute value for the variation of the positional error exceeds a first reference value designated in advance, and addition of the backlash acceleration amount to the speed command or the torque command is started if the absolute value for the variation of the positional error exceeds a second reference value designated in advance.

According to a thirteenth aspect of the present invention, a second non-transitory computer readable medium is a non-transitory computer readable medium recording a motor control program for correcting backlash between a movable part that is driven by a motor and a driven part that is driven by the movable part, the program enabling a computer to execute the steps of: detecting a first position which is a position of the movable part; detecting a second position which is a position of the driven part; calculating a positional error which is a deviation between a converted first position detected value arrived at by converting a first position detected value that was detected in the step of detecting a first position into a value of a position of the driven part according to a rotation ratio between the movable part and the driven part, and a second position detected value that was detected in the step of detecting a second position; creating a position command; detecting reversal of the position command; calculating an absolute value for variation of the positional error since reversal was detected; calculating an absolute value for a change rate of the positional error per unit time since reversal was detected; determining whether the absolute value for the change rate of the positional error has exceeded a predetermined reference value; determining whether the absolute value for the variation of the positional error has exceeded a predetermined reference value; adding a backlash correction amount to the position command based on the positional error; calculating a speed command or a torque command from a position command to which the backlash correction amount was added; and adding a backlash acceleration amount to the speed command or the torque command, in which addition of the backlash correction amount to the position command is started if the absolute value for the change rate of the positional error exceeds a first reference value designated in advance, and addition of the backlash acceleration amount to the speed command or the torque command is started if the absolute value for the variation of the positional error exceeds a second reference value designated in advance.

According to a fourteenth aspect of the present invention, a third non-transitory computer readable medium is a non-transitory computer readable medium recording a motor control program for correcting backlash between a movable part that is driven by a motor and a driven part that is driven by the movable part, the program enabling a computer to execute the steps of: detecting a first position which is a position of the movable part; detecting a second position which is a position of the driven part; calculating a positional error which is a deviation between a converted first position detected value arrived at by converting a first position detected value that was detected in the step of detecting a first position into a value of a position of the driven part according to a rotation ratio between the movable part and the driven part, and a second position detected value that was detected in the step of detecting a second position; creating a position command; detecting reversal of the position command; calculating an absolute value for variation of the positional error since reversal was detected; calculating an absolute value for a change rate of the positional error per motor rotation angle unit variation since reversal was detected; determining whether the absolute value for the change rate of the positional error has exceeded a predetermined reference value; determining whether the absolute value for the variation of the positional error has exceeded a predetermined reference value; adding a backlash correction amount to the position command based on the positional error; calculating a speed command or a torque command from a position command to which the backlash correction amount was added; and adding a backlash acceleration amount to the speed command or the torque command, in which addition of the backlash correction amount to the positional error is started if the absolute value for the change rate of the positional error exceeds a first reference value designated in advance, and addition of the backlash acceleration amount to the speed command or the torque command is started if the absolute value for the variation of the positional error exceeds a second reference value designated in advance.

According to a fifteenth aspect of the present invention, a fourth non-transitory computer readable medium is a non-transitory computer readable medium recording a motor control program for correcting backlash between a movable part that is driven by a motor and a driven part that is driven by the movable part, the program enabling a computer to execute the steps of: detecting a first position which is a position of the movable part; detecting a second position which is a position of the driven part; calculating a positional error which is a deviation between a converted first position detected value arrived at by converting a first position detected value that was detected in the step of detecting a first position into a value of a position of the driven part according to a rotation ratio between the movable part and the driven part, and a second position detected value that was detected in the step of detecting a second position; creating a position command; detecting reversal of the position command; calculating an absolute value for variation of the positional error since reversal was detected; calculating an absolute value for a change rate of the positional error per unit variation of an integral value of the position command since reversal was detected; determining whether the absolute value for the change rate of the positional error has exceeded a predetermined reference value; determining whether the absolute value for the variation of the positional error has exceeded a predetermined reference value; adding a backlash correction amount to the position command based on the positional error; calculating a speed command or a torque command from a position command to which the backlash correction amount was added; and adding a backlash acceleration amount to the speed command or the torque command, in which addition of the backlash correction amount to the position command is started if the absolute value for the change rate of the positional error exceeds a first reference value designated in advance, and addition of the backlash acceleration amount to the speed command or the torque command is started if the absolute value for the variation of the positional error exceeds a second reference value designated in advance.

According to a sixteenth aspect of the present invention, a fifth non-transitory computer readable medium is a non-transitory computer readable medium recording a motor control program for correcting backlash between a movable part that is driven by a motor and a driven part that is driven by the movable part, the program enabling a computer to execute the steps of: detecting a first position which is a position of the movable part; detecting a second position which is a position of the driven part; calculating a positional error which is a deviation between a converted first position detected value arrived at by converting a first position detected value that was detected in the step of detecting a first position into a value of a position of the driven part according to a rotation ratio between the movable part and the driven part, and a second position detected value that was detected in the step of detecting a second position; creating a position command; detecting reversal of the position command; calculating an absolute value for a change rate of the positional error per unit time since reversal was detected; determining whether the absolute value for the change rate of the positional error has exceeded a predetermined reference value; adding a backlash correction amount to the position command based on the positional error; calculating a speed command or a torque command from a position command to which the backlash correction amount was added; and adding a backlash acceleration amount to the speed command or the torque command, in which addition of the backlash correction amount to the position command is started if the absolute value for the change rate of the positional error exceeds a first reference value designated in advance, and addition of the backlash acceleration amount to the speed command or the torque command is started if the absolute value for the change of the positional error is less than a third reference value at the same time as exceeding a second reference value designated in advance.

According to the present invention, it is possible to add a backlash acceleration amount to a speed command or a torque command for a motor at the appropriate timing.

BRIEF DESCRIPTION OF THE DRAWINGS

FIGS. 8A and 8B provide graphs showing the timing of backlash correction and backlash acceleration of the motor control device according to the third embodiment of the present invention;

FIG. 12 is a graph showing the timing of backlash correction and backlash acceleration of the motor control device according to the fifth embodiment of the present invention.

DETAILED DESCRIPTION OF THE INVENTION

Figure 1A:
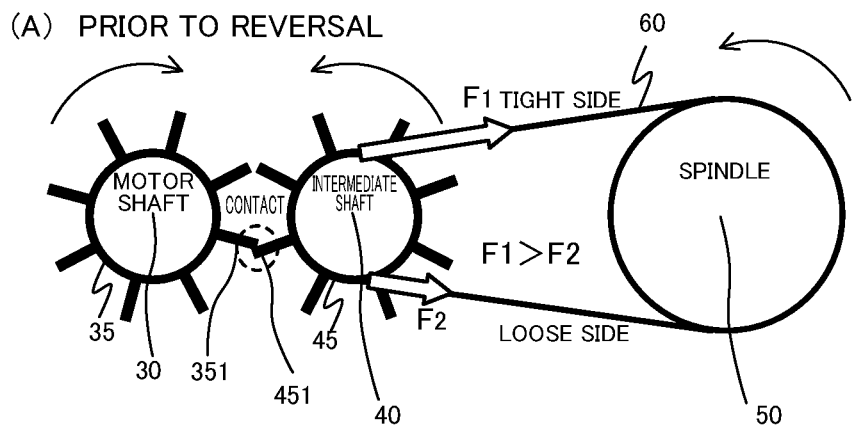
FIG. 1A is an explanatory drawing for the behaviors of each shaft during reversal of a motor.

Hereinafter, embodiments of the present invention will be explained using FIGS. 1A to 12. FIGS. 1A to 1E are explanatory drawings for an overview of the present invention, and specifically illustrate the behavior of each shaft during reversal of a motor, when a reduction mechanism between the motor and a driven shaft (spindle) is configured from gears and a belt. It should be noted that, in the case of making an explanation shared in FIG. 1A to FIG. 1E, it may be referred to as "FIG. 1".

As shown in FIGS. 1A to 1E, a motor shaft gear 35 is fixed to the motor shaft 30 as a movable part. An intermediate shaft gear 45 is fixed to an intermediate shaft 40 which is provided separately from the motor shaft 30. In addition, by teeth 351 of the motor shaft gear 35 and teeth 451 of the intermediate shaft gear 45 meshing, in the case of the motor shaft 30 rotating in the clockwise direction, the intermediate shaft 40 will rotate in the counter-clockwise direction, while in the case of the motor shaft 30 rotating in the counter-clockwise direction, the intermediate shaft 40 will rotate in the clockwise direction. Furthermore, an endless belt 60 having elasticity is bridged between a portion of the intermediate shaft 40 at which the intermediate shaft gear 45 is not provided and the spindle 50 serving as a driven part.

Thereby, in a case of the intermediate shaft 40 rotating in the clockwise direction, the spindle 50 will rotate in the clockwise direction following this, while in the case of the intermediate shaft 40 rotating in the counter-clockwise direction, the spindle 50 will rotate in the counter-clockwise direction following this. The rotation of the motor shaft 30, intermediate shaft 40 and spindle 50 are thereby linked. More specifically, in the case of the motor shaft 30 rotating in the clockwise direction, the spindle 50 will rotate in the counter-clockwise direction, while in the case of the motor shaft 30 rotating in the counter-clockwise direction, the spindle 50 will rotate in the clockwise direction. In other words, the motor shaft 30 driven by the motor 20, and the spindle 50 driven by the motor shaft 30 are mechanically joined by the combination of the gears 35, 45 and the belt 60.

FIG. 1A shows an aspect of the positions of the motor shaft gear 35 and intermediate shaft gear 45 prior to reversal of the motor 20, and the tension acting on the belt 60. Herein, a case of the motor shaft 30 rotating in the clockwise direction is assumed. It should be noted that the embodiments of the present invention are not to be limited thereto.

As mentioned above, the motor shaft gear 34 and intermediate shaft gear 45 mesh, and the tooth 351 of the motor shaft gear 35 and the tooth 451 of the intermediate shaft gear 45 shown in FIG. 1A contact. Since the motor shaft 30 rotates in the clockwise direction, it forms a state in which the tooth 351 is pressing the tooth 451 downwards. Following this, the intermediate shaft gear 45, and consequently the intermediate shaft 40, rotate in the counter-clockwise direction. It should be noted that, upon making explanations shared with the plurality of tooth 351 of the motor shaft gear 35, it will be made to express "teeth 351" representatively.

Figure 1B:
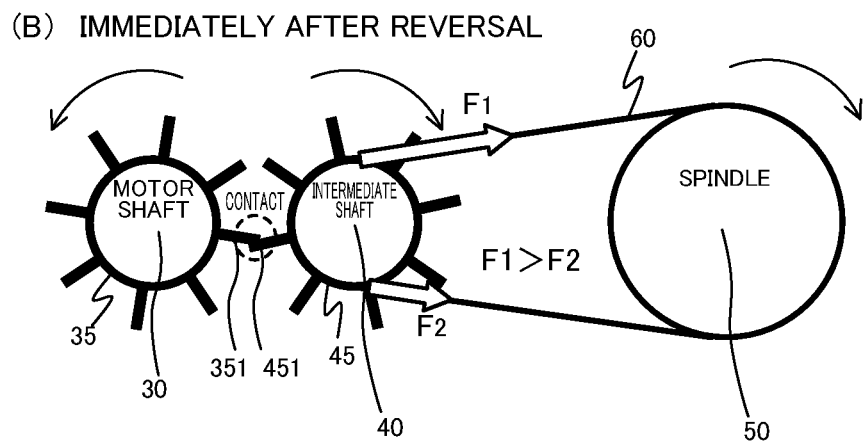
FIG. 1B is an explanatory drawing for the behaviors of each shaft during reversal of a motor.

Next, FIG. 1B shows an aspect of the positions of the motor shaft gear 35 and intermediate shaft gear 45, and the tension acting on the belt 60, immediately after the motor 20 starts reversing in the counter-clockwise direction.

Accompanying the reversing of the motor shaft 30 to the counter-clockwise direction, since the motor shaft gear 35 will also rotate in the counter-clockwise direction, the tooth 351 of the motor shaft gear 35 will no longer press the tooth 451 of the intermediate shaft gear 45 downwards, and will start to move upwards. On the other hand, in the belt 60 bridged to the intermediate shaft 40, due to the tension F1 of the upper side un-wound portion becoming greater than the tension F2 of the lower side un-wound portion in FIG. 1, as mentioned above, the intermediate shaft 40 starts to rotate in the clockwise direction. Accompanying this, the spindle 50 also starts rotation in the clockwise direction. Upon doing so, the tooth 451 of the intermediate shaft gear 45 is not pressed against the tooth 351 of the motor shaft gear 35. In addition, accompanying rotation of the intermediate shaft gear 45 in the clockwise direction, the tooth 451 of the intermediate shaft gear 45 continues to contact with the tooth 351 of the motor shaft gear 35, due to moving upwards in FIG. 1. In other words, at this stage, a gap between the teeth 351 of the motor shaft gear 35 and the teeth 451 of the intermediate shaft gear 45, i.e. backlash, still has not occurred.

As mentioned above, the intermediate shaft 40 and spindle 50 will rotate in the clockwise direction, due to the tension F1 on the upper side un-wound portion of the belt 60 being greater than the tension F2 on the lower side un-wound portion. Then, accompanying continuing rotation to the clockwise direction, the difference between the two tensions F1 and F2 becomes smaller.

Figure 1C:
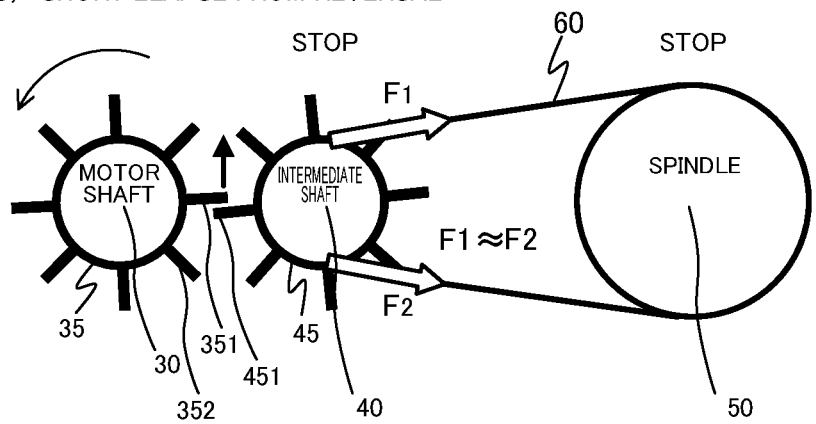
FIG. 1C is an explanatory drawing for the behaviors of each shaft during reversal of a motor.

Soon thereafter, as shown in FIG. 1C, rotation of the intermediate shaft 40, and consequently the spindle 50, stops at the stage at which the tension F1 and tension F2 become substantially equal. On the other hand, since the motor shaft 30 continues reversal to the counter-clockwise direction, a gap between the tooth 351 of the motor shaft gear 34 and the tooth 451 of the intermediate shaft gear 45, i.e. backlash, occurs.

Figure 1D:
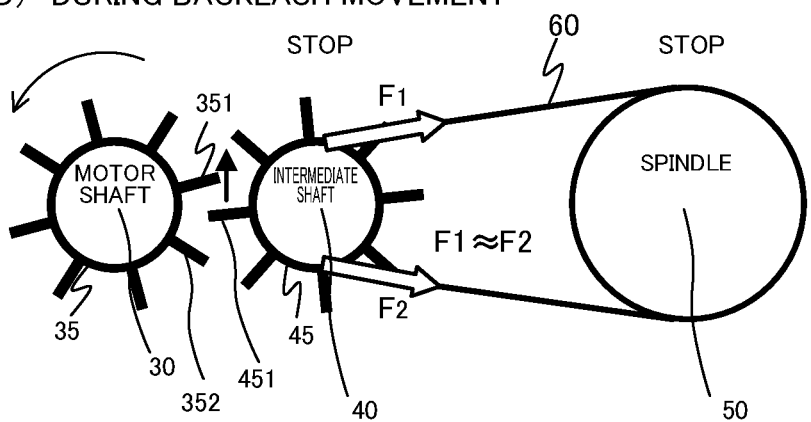
FIG. 1D is an explanatory drawing for the behaviors of each shaft during reversal of a motor.

Subsequently, as shown in FIG. 1D, while in a state in which rotation of the intermediate shaft 40 and spindle 50 stops, i.e. while in a state in which tension F1 and tension F2 are substantially equal, the motor shaft 30 continues rotation in the counter-clockwise direction, and the tooth 351 of the motor shaft gear 35 moves the backlash between the tooth 351 of the motor shaft gear 35 and the tooth 451 of the intermediate shaft gear 45.

Figure 1E:
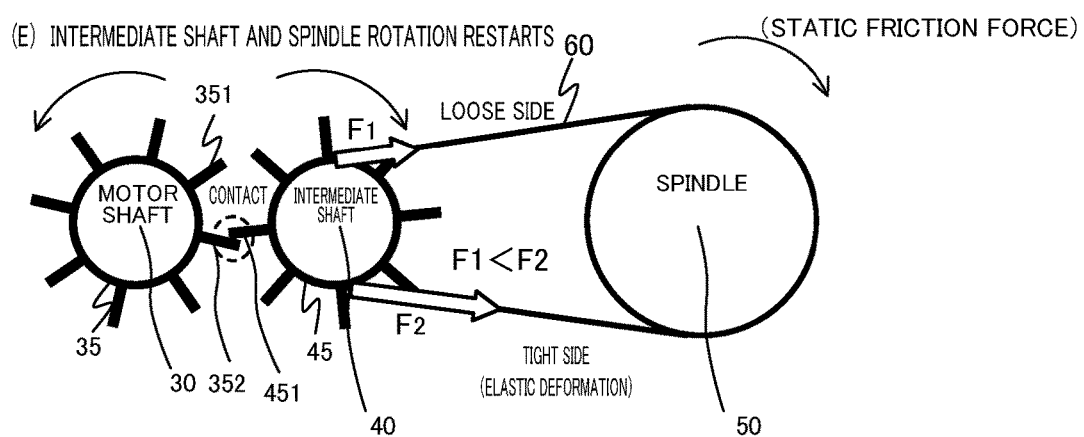
FIG. 1E is an explanatory drawing for the behaviors of each shaft during reversal of a motor.

Subsequently, as shown in FIG. 1E, a tooth 352 that is at the lower side of the above-mentioned tooth 351 among the teeth of the motor shaft gear 35 moves by the above-mentioned backlash amount, and then contacts the tooth 451 of the intermediate shaft from the lower side. The intermediate shaft 40, and consequently the spindle 50, thereby start rotation in the clockwise direction again. It should be noted that, in FIG. 1E, the rotation direction of each shaft is opposite to FIG. 1A.

More specifically, among the two un-wound portions of the belt 60 existing between the intermediate shaft 40 and spindle 50, the spindle 50 rotates clockwise by way of the lower side un-wound portion in FIG. 1E drawing the spindle 50 in the clockwise direction. In other words, the lower side un-wound portion of the belt 60 is the "tight side", and the upper side un-wound portion is the "loose side". Herein, in the case of defining the tension on the upper side un-wound portion of the belt 60 as F1, and the tension on the lower side un-wound portion of the belt 60 as F2, F1 will be less than F2.

Based on the above, in the case of the reduction mechanism between the motor 20 and spindle 50 being configured from the gears 35, 45 and the belt 60, when put in other words, in the case of the motor shaft 30 driven by the motor 20, and the spindle 50 driven by the motor shaft 30 being mechanically joined by the combination of the gears 35, 45 and the belt 60, although the spindle 50 will immediately start reversal immediately after reversing of the motor 20, the rotation of the spindle 50 temporarily stops a short time thereafter, and will make movement again such that the reversing operation of the spindle 50 is started subsequently.

Herein, if assuming to perform backlash correction so that the tooth 351 of the motor shaft gear 34 can quickly move by the above-mentioned backlash amount immediately after reversal of the motor 20, in addition to the tension on the tight side of the belt 60, the force of backlash correction acts, and the intermediate shaft 40 will suddenly reverse. Accompanying this, the spindle 50 would also suddenly reverse, and the position of the spindle 50 would advance more ahead than from the position commanded according to the position command.

To prevent this, it is necessary to perform backlash correction on the position command not by performing correction immediately after reversal, but rather by having reversal performed spontaneously at the intermediate shaft gear 45 for a moment, and the tension on the tight side of the belt 60 relaxing.

Along with this, rotation is started by the spindle 50 being drawn by the belt 60 after performing addition of the backlash correction amount to the position command; however, rotation of the spindle 50 to the reverse direction is delayed by the influences of the elastic deformation of the belt 60, and static frictional force occurring upon the spindle 50 beginning rotation. In such a case, the gear 351 stops moving within the backlash amount, and it is necessary to add the backlash acceleration amount to the speed command or torque command at the timing at which the spindle 50 starts to be drawn by the belt 60.

In other words, in the case of measuring the variation or change rate of the positional error after command reversal, and this variation exceeding a reference value, or in the case of the change rate of positional error greatly changing, it is regarded as the reversal delay of the spindle occurring due to backlash, and the backlash correction is applied. At the same time, since the timing at which movement within backlash ends is understood from the variation in the positional error after reversal detection, backlash acceleration is applied at the appropriate timing. Alternatively, since the change rate of the positional error when reversal delay occurs due to friction or elastic deformation is a change that is gentler than the change rate of positional error when reversal delay occurs due to backlash, backlash acceleration is applied at the appropriate timing by measuring the change rate of positional error.

The timing at which starting addition of the backlash correction amount and addition of the backlash acceleration amount is determined by monitoring the positional error, and adding the backlash correction amount and the backlash acceleration amount at respectively appropriate timings is a concept serving as the basis of the present invention.

First Embodiment

Figure 2:
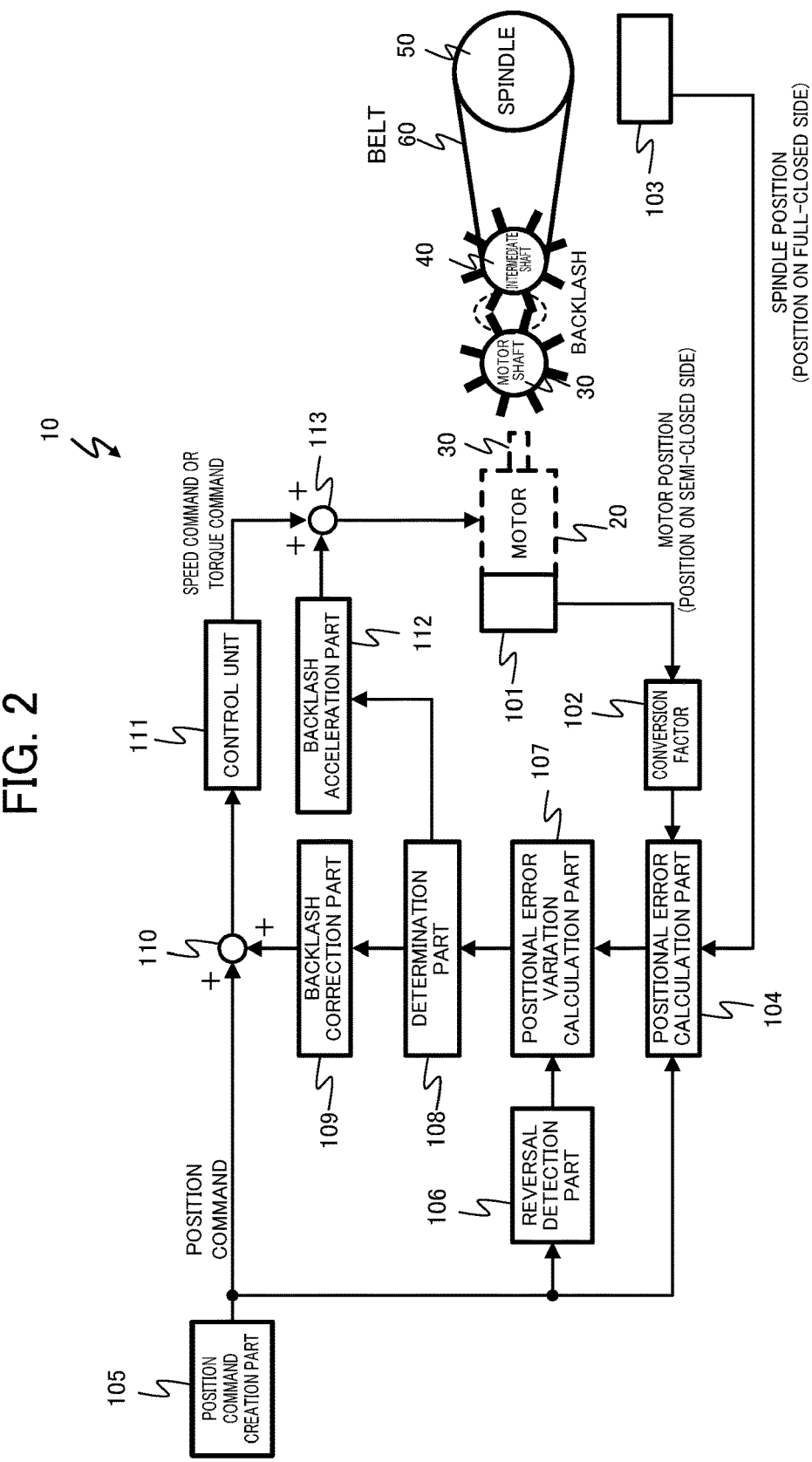
FIG. 2 is a view showing the configuration of a motor control device according to a first embodiment of the present invention.

FIG. 2 is a view showing the configuration of a motor control device 10 according to a first embodiment.

The motor control device 10 mainly includes; a first position detection part 101 such as an encoder that detects the position of the motor shaft 30 (referred to as "first position" or "motor position") serving as the movable part driven by the motor 20; a second position detection part 103 that detects the position of the spindle 50 (referred to as "second position" or "spindle position"), which is the driven part being driven by the above-mentioned movable part (motor shaft 30); and a positional error calculation part 104 that calculates the deviation between the aforementioned first position and second position (referred to as "positional error"). It should be noted that the above-mentioned "first position" or "motor position" is a position acquired using a semi-closed loop, and the "second position" or "spindle position" is a position acquired using a full-closed loop.

Furthermore, the motor control device 10 includes a position command creation part 105, reversal detection part 106, positional error variation calculation part 107, determination part 108, backlash correction part 109, first adder 110, control unit 111, backlash acceleration part 112, and second adder 113. The position command creation part 105 creates a position command for the above-mentioned motor 20. The reversal detection part 106 detects reversal of the above-mentioned position command. The positional error variation calculation part 107 calculates the variation in the above-mentioned positional error after reversal is detected. The determination part 108 determines whether the variation in the above-mentioned positional error has exceeded a first reference value or a second reference value. The backlash correction part 109 calculates the backlash correction amount in the case of the variation in the above-mentioned positional error exceeding the first reference value, and adds this backlash correction amount to the above-mentioned position command using the first adder 110. The control unit 111 adds the speed command or torque command to the position command after adding the above-mentioned backlash correction amount thereto. The backlash acceleration part 112 calculates the backlash acceleration amount, and adds this backlash acceleration amount to the above-mentioned speed command or torque command, using the second adder 113, in the case of the variation in the above-mentioned positional error exceeding the second reference value. The position command to which the above-mentioned backlash correction amount was added, and the speed command or torque command to which the backlash acceleration amount was added are sent to the motor 20 from the second adder 113.

It should be noted that the above-mentioned positional error calculation part 104 calculates the deviation between the above-mentioned first position and second position as the positional error. More specifically, by multiplying a conversion factor 102 by the above-mentioned first position detected value, a converted first position detected value arrived at by converting to the value of the position of the driven part (spindle position) is calculated, and the deviation between this converted first position detected value and the second position detected value is calculated as the positional error. As this conversion factor 102, for example, it is possible to use the rotation ratio between the movable part (motor shaft 30) and the driven part (spindle 50).

In addition, the above-mentioned backlash correction amount and backlash acceleration amount can be calculated according to a known method, using either or both of the above-mentioned first position and second position, for example, a relative position relationship between the first position and second position, or the above-mentioned positional error. As one example, it may be calculated using the method described in Patent Document 1 or Patent Document 2.

Figure 3:
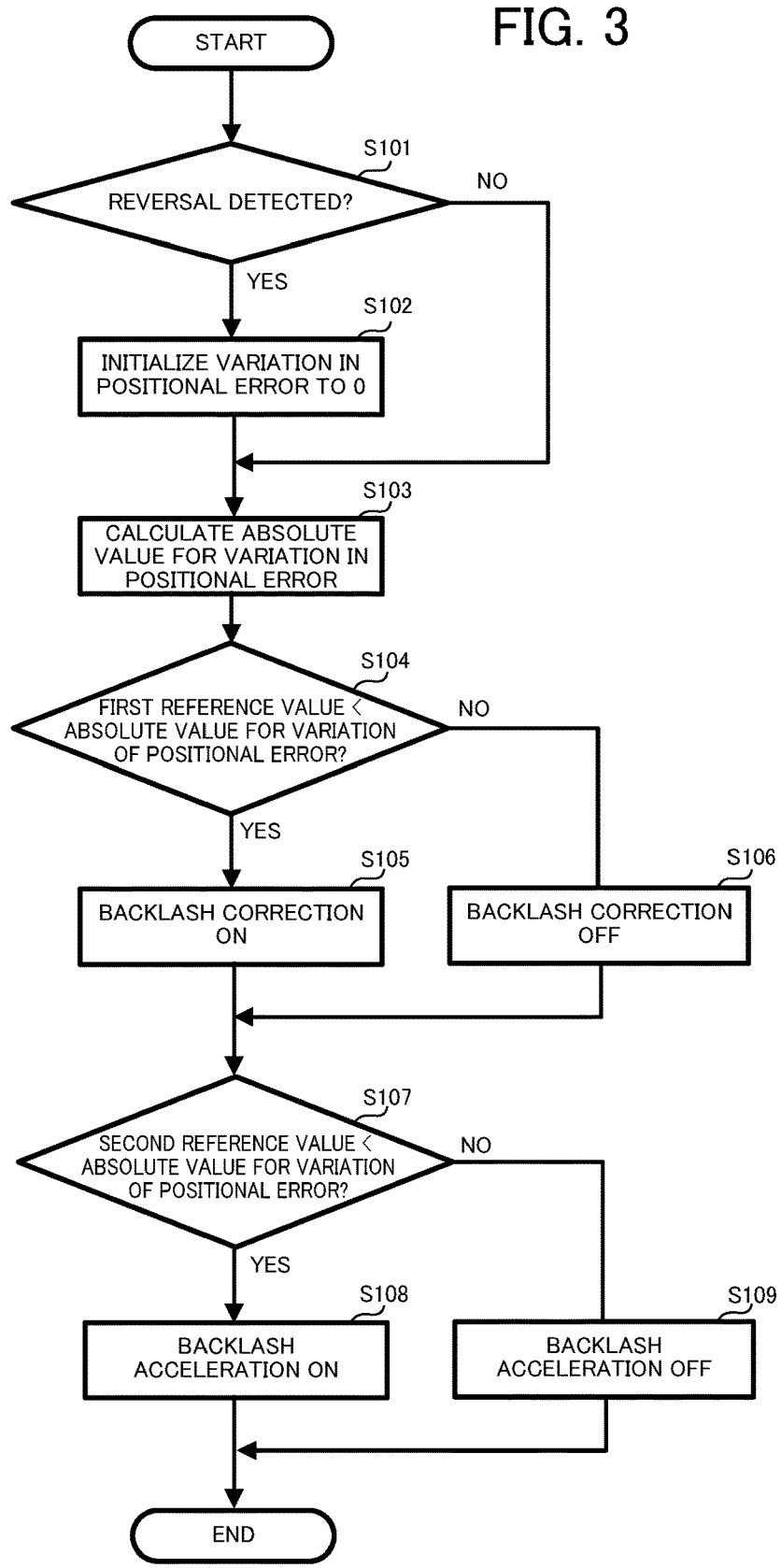
FIG. 3 is a flowchart showing the processing of the motor control device according to the first embodiment of the present invention.

Next, although partially repeated, the operation flow of the above-mentioned motor control device 10 will be explained using FIG. 3.

First, the reversal detection part 106 monitors reversal of the position command created by the position command creation part 105 (Step S101). In the case of reversal being detected (S101: YES), the positional error variation calculation part 107 initializes the variation of positional error to 0 (Step S102). Then, the positional error variation calculation part 107 calculates the absolute value for variation of the positional error (Step S103). On the other hand, in the case of reversal of the position command not being detected (S101: NO), rather than passing through the step of initialization of S102 again, the positional error variation calculation part 107 calculates the absolute value for the variation of the positional error.

Next, the determination part 108 compares the absolute value for the variation in the above-mentioned positional error with a first reference value (Step S104). In the case of this absolute value having exceeded the first reference value (S104: YES), the backlash correction part 109 adds the backlash correction amount to the position command. In other words, it sets the backlash correction to ON (Step S105). In the case of the above-mentioned absolute value not exceeding the first reference value (S104: NO), the backlash correction part 109 does not add the backlash correction amount to the position command. In other words, it sets the backlash correction to OFF (Step S106).

Next, the determination part 108 compares the absolute value for the variation in the above-mentioned positional error with the second reference value (Step S107). In the case of this absolute value exceeding the second reference value (S107: YES), the backlash acceleration part 112 adds the backlash acceleration amount to the speed command or torque command. In other words, the motor control device 10 sets the backlash acceleration to ON (Step S108). In the case of the above-mentioned absolute value not exceeding the second reference value (S107: NO), the backlash acceleration part 112 does not add the backlash acceleration amount to the speed command or torque command. In other words, the motor control device 10 sets the backlash acceleration to OFF (Step S109).

Figure 4:
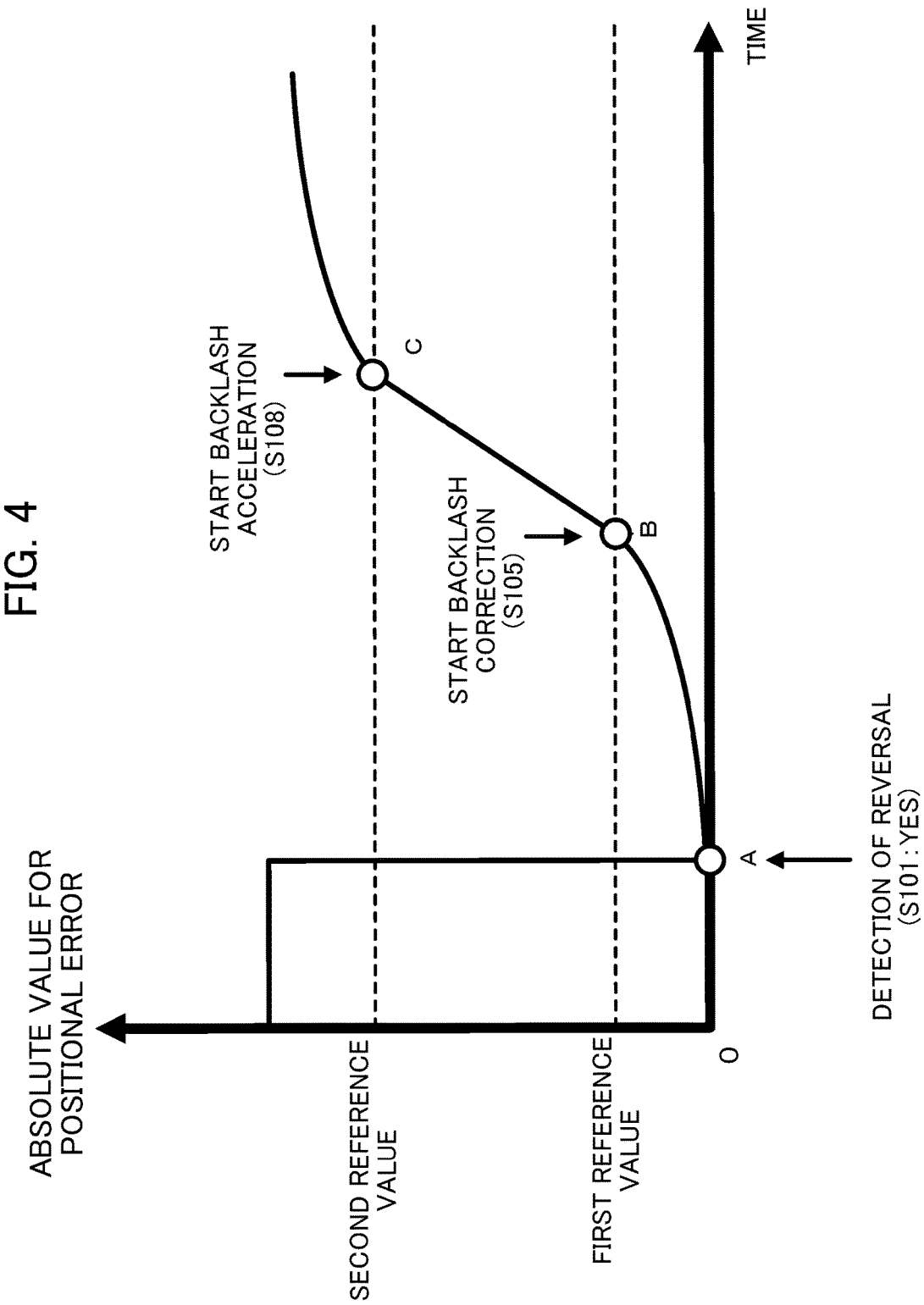
FIG. 4 is a graph showing the timing of backlash correction and backlash acceleration of the motor control device according to the first embodiment of the present invention.

FIG. 4 is a view showing the continuous change in the absolute value for the variation in the positional error and the timing of backlash correction and backlash acceleration, upon the determination part 108 comparing the absolute value for the variation in positional error with the predetermined reference value. In the case of detecting reversal in Step S101, since the absolute value for the positional error is initialized to 0 in the above-mentioned way, the graph of the absolute value for the positional error draws a vertically downwards trajectory relative to the time axis, and reaches point A, as shown in FIG. 4. Subsequently, although the absolute value for the positional error is increasing, the backlash correction part 109 adds the backlash correction amount to the position command at the stage exceeding the first reference value, i.e. in Step S105 corresponding to point B in FIG. 4. Thereafter, although the absolute value for the positional error is further increasing, the backlash acceleration part 112 adds the backlash acceleration amount to the speed command or torque command at the stage exceeding the second reference value, i.e. in Step S108 corresponding to point C in FIG. 4.

It becomes possible to add the backlash correction amount to the position command for the motor 20 at the appropriate timing, and to add the backlash acceleration amount to the speed command or torque command for the motor 20 at the appropriate timing, by way of the motor control device according to the first embodiment.

Second Embodiment

Figure 5:
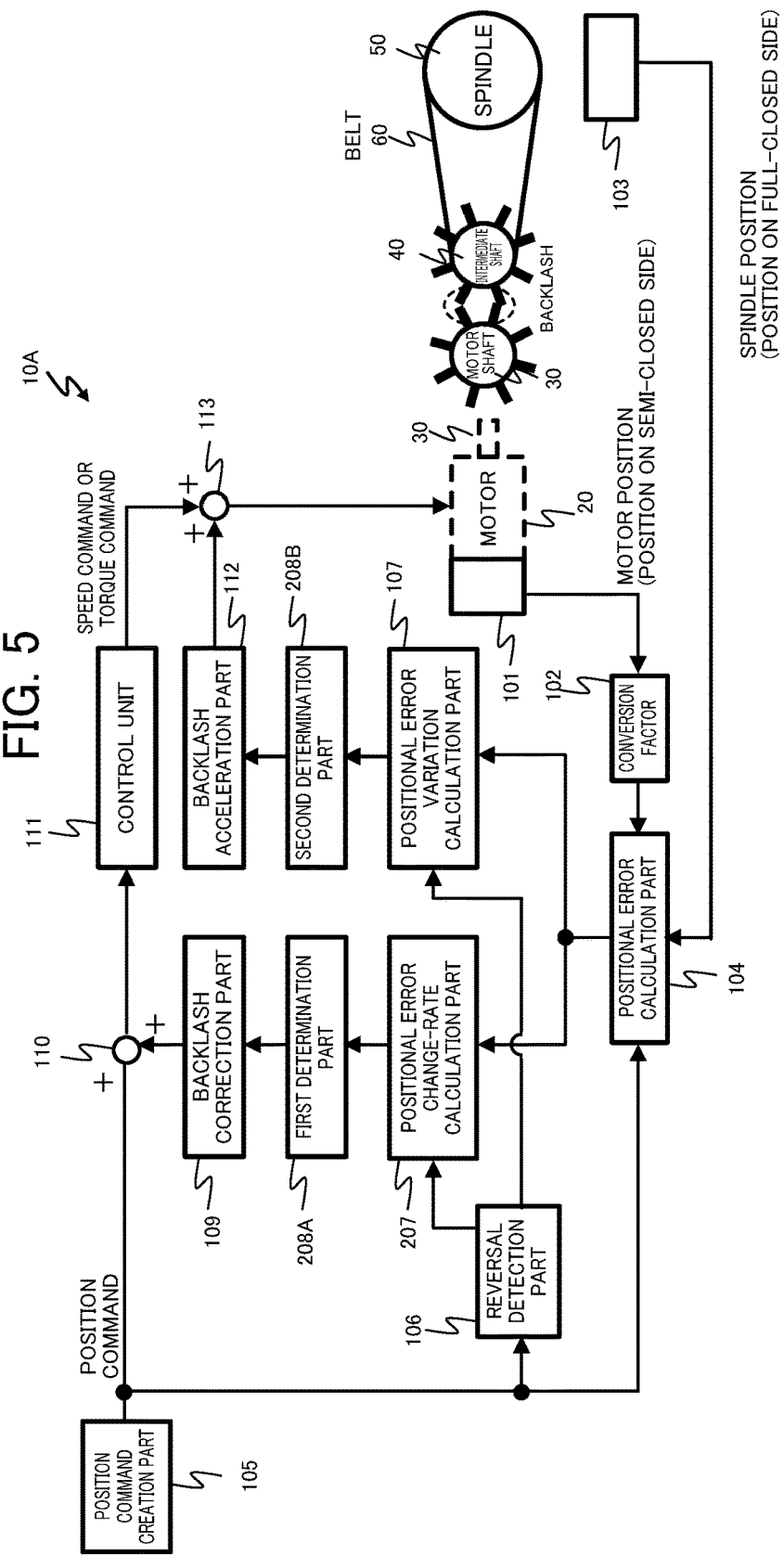
FIG. 5 is a view showing the configuration of motor control devices according to second to fourth embodiments of the present invention.

FIG. 5 is a view showing the configuration of a motor control device 10A according to the second embodiment. It should be noted that the same reference symbols are used for constituent elements that are the same as the motor control device 10 according to the first embodiment, and specific explanations thereof will be omitted.

The motor control device 10A according to the second embodiment differs in the point of including a positional error change-rate calculation part 207 in addition the positional error variation calculation part 107 of the motor control device 10 according to the first embodiment. In addition, concerning the determination part, only the determination part 108 is present in the motor control device 10 according to the first embodiment, and one determination part 108 mediates between the positional error variation calculation part 107, and the backlash correction part 109 and backlash acceleration part 112. On the other hand, a first determination part 208A mediating between the positional error change-rate calculation part 207 and backlash correction part 109, and a second determination part 208B mediating between the positional error variation calculation part 107 and the backlash acceleration part 112 are present in the motor control device 10A according to the second embodiment. Furthermore, the motor control device 10 according to the first embodiment sets the backlash correction to ON in the case of the variation of the positional error having exceeded the predetermined reference value; however, the motor control device 10A according to the second embodiment sets the backlash correction to ON in the case of the change rate of the positional error having exceeded a predetermined reference value.

Figure 6:
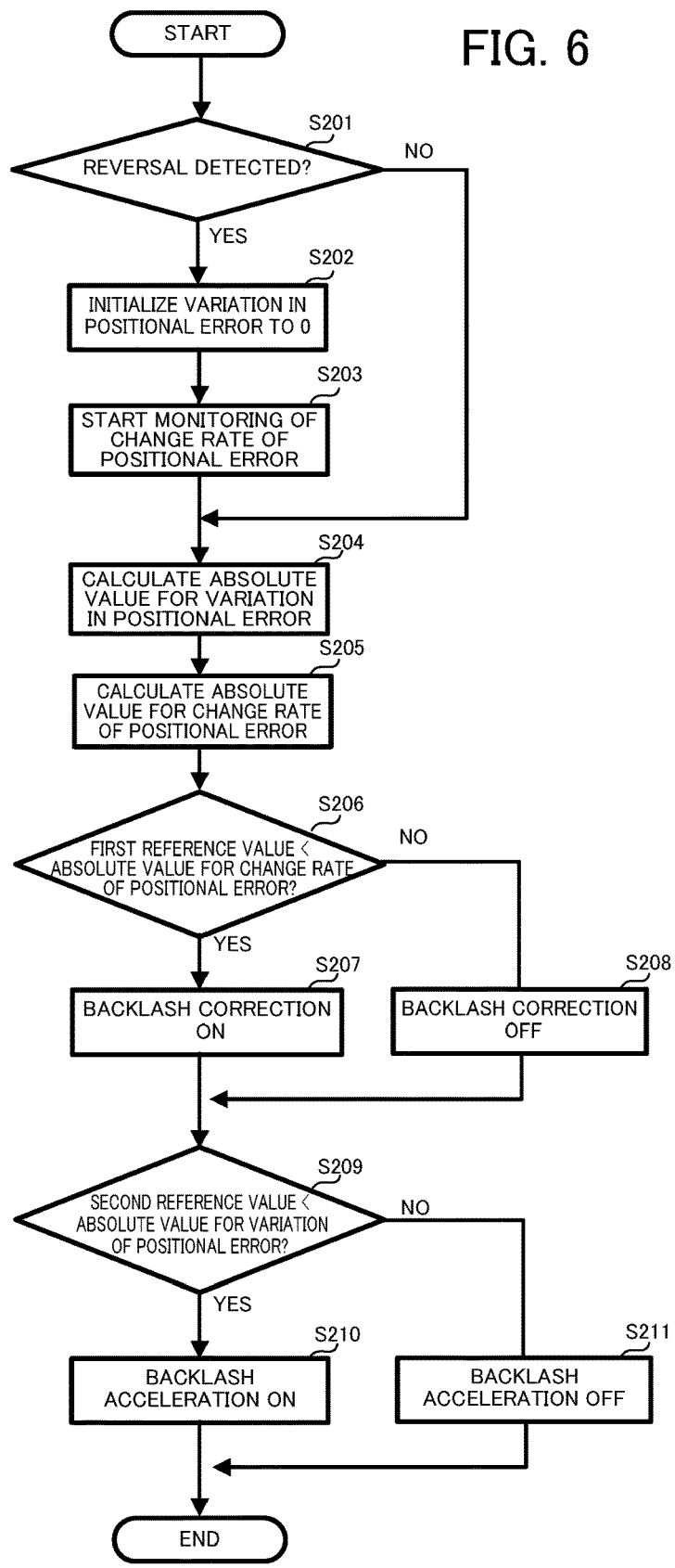
FIG. 6 is a flowchart showing the processing of the motor control devices according to second to fourth embodiments of the present invention.

Next, although partially repeating, the operation flow of the above-mentioned motor control device 10A will be explained using FIG. 6.

First, the reverse detection part 106 monitors reversal of the position command created by the position command creation part 105 (Step S201). In the case of reversal being detected (S201: YES), the positional error variation calculation part 107 initializes the variation in positional error to 0 (Step S202). Then, the positional error change-rate calculation part 207 starts monitoring of the change rate per unit time of the positional error (Step S203). Subsequently, the positional error variation calculation part 107 calculates the absolute value for the variation in positional error (Step S204). The positional error change-rate calculation part 207 calculates the absolute value for the change rate per unit time of the positional error (Step S205). On the other hand, in the case of reversal of the position command not being detected (S201: NO), the positional error variation calculation part 107 calculates the absolute value for the variation in positional error, and the positional error change-rate calculation part 207 calculates the absolute value for the change rate per unit time of the positional error, without passing through the step of initiation in Step S202 and the step of monitoring start in Step S203 again.

Next, the first determination part 208A compares the absolute value for the change rate per unit time of the above-mentioned positional error with the first reference value (Step S206). In the case of this absolute value having exceeded the first reference value (S206: YES), the backlash correction part 109 adds the backlash correction amount to the position command. In other words, the motor control device 10A sets the backlash correction to ON (Step S207). In the case of the above-mentioned absolute value not exceeding the reference value (S206: NO), the backlash correction part 109 does not add the backlash correction amount to the position command. In other words, the motor control device 10A sets the backlash correction to OFF (Step S208).

Next, the second determination part 208B compares the absolute value for the variation in the above-mentioned positional error with the second reference value (Step S209). In the case of this absolute value exceeding the second reference value (S209: YES), the backlash acceleration part 112 adds the backlash acceleration amount to the speed command or torque command. In other words, the motor control device 10A sets the backlash acceleration to ON (Step S210). In the case of the above-mentioned absolute value not exceeding the reference value (S209: NO), the backlash acceleration part 112 does not add the backlash acceleration amount to the position command. In other words, the motor control device 10A sets the backlash acceleration to OFF (Step S211).

Figure 7A:
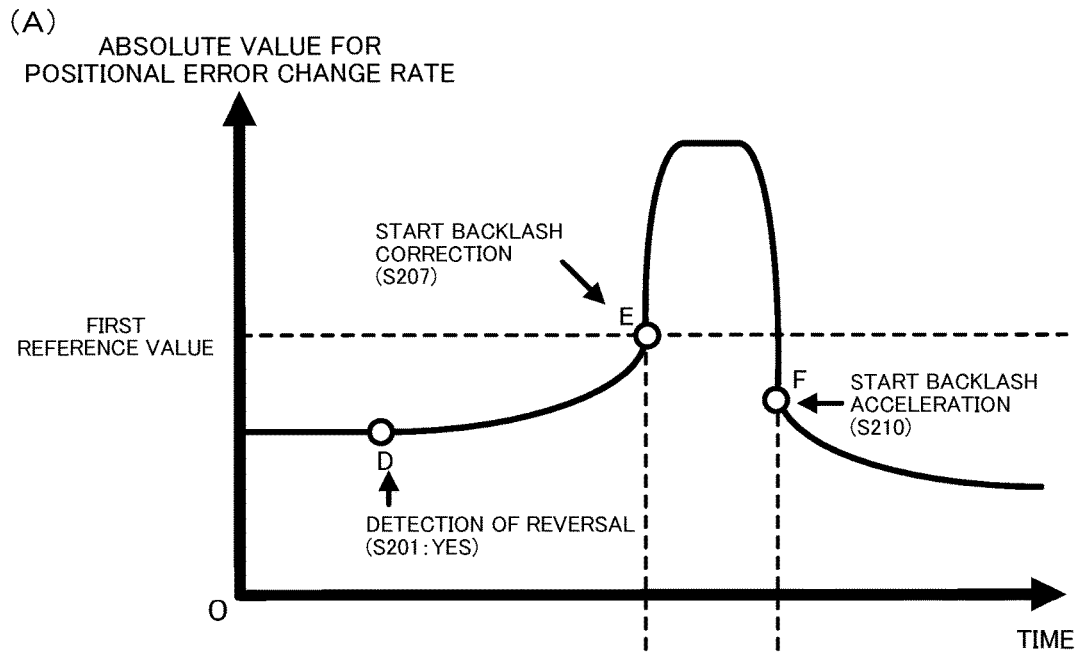
FIGS. 7A and 7B provide graphs showing the timing of backlash correction and backlash acceleration of the motor control device according to the second embodiment of the present invention.

FIG. 7A is a graph showing the successive change in the absolute value for the change rate per unit time of the positional error, and the timing of backlash correction, upon the first determination unit 208A comparing the absolute value for the change rate per unit time of the positional error with the first reference value. Although the absolute value for the change rate increases after detecting reversal is detected at point D corresponding to Step S201, the backlash correction part 109 adds the backlash correction amount to the position command, at the stage exceeding the reference value, i.e. Step S207 corresponding to point E in FIG. 7A.

Figure 7B:
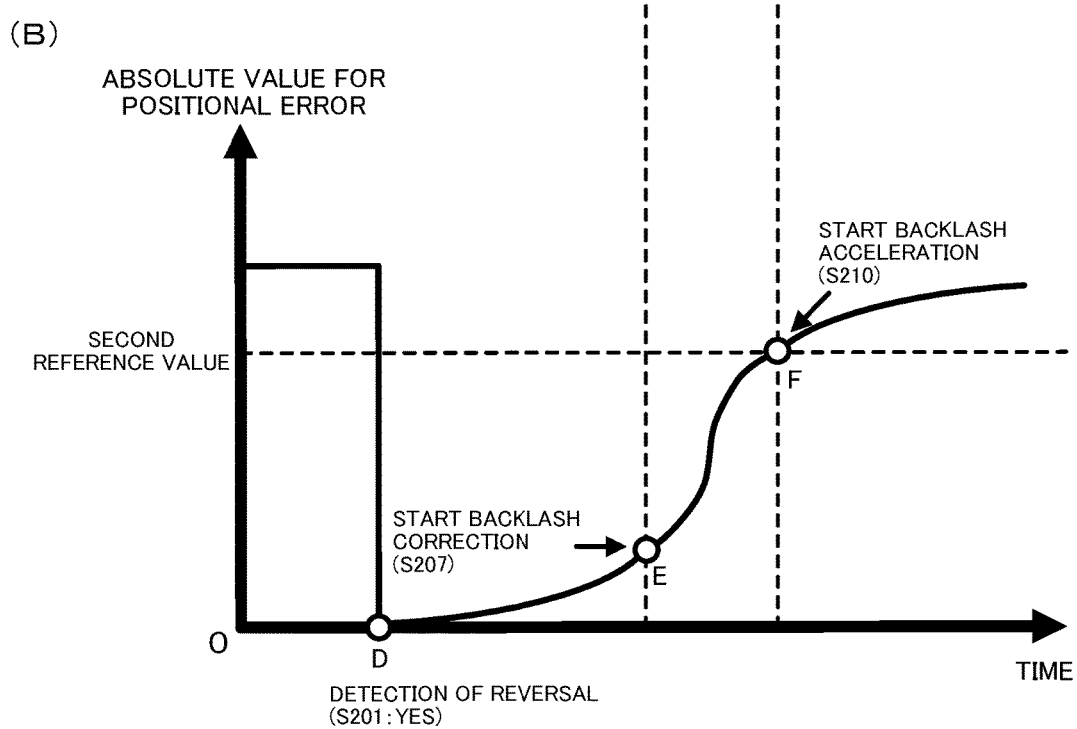

FIG. 7B is a view showing the successive change in the absolute value for the variation in positional error, and the timing of backlash acceleration, upon the second determination part 208B comparing the absolute value for the variation in positional error with the second reference value. Although the absolute value for the variation is increasing after starting the backlash correction at point E corresponding to Step S207, the backlash acceleration part 112 adds the backlash acceleration amount to the speed command or torque command, at the stage exceeding the second reference value, i.e. in Step S210 corresponding to point F in FIG. 7B.

Also in the motor control device according to the second embodiment, it is possible to add the backlash correction amount to the position command for the motor 20 at the appropriate timing, and to add the backlash acceleration amount to the speed command or torque command for the motor 20 at the appropriate timing, similarly to the motor control device according to the first embodiment.

Third Embodiment

FIG. 8A is a graph showing the change in the absolute value for the change rate of the positional error and the timing of backlash correction upon the first determination part 208A of a motor control device according to a third embodiment comparing the absolute value for the change rate of the positional error with a reference value. In addition, FIG. 8B is a graph showing the successive change in the absolute value for the variation of positional error and the timing of backlash acceleration, upon the second determination part 208B comparing the absolute value for the variation of the positional error with the second reference value. It should be noted that, since the motor control device according to the third embodiment is the same configuration as the motor control device 10A according to the second embodiment, explanations thereof will be omitted. In addition, since the operation flow of the motor control device according to the third embodiment is basically identical to the motor control device 10A according to the second embodiment, explanation thereof will be omitted.

In the second embodiment, although the absolute value for the change rate of the positional error per unit time is compared with the predetermined reference value, in the third embodiment, the absolute value for the change rate in the positional error per unit variation of motor revolution angle is compared with a first reference value. For this reason, the horizontal axis in FIG. 8A is the motor rotation angle.

Similarly to FIG. 7A, the absolute value for the change rate increases after detecting reversal at point G corresponding to Step S201 in FIG. 8A; however, the backlash correction part 109 adds the backlash correction amount to the position command, at the stage exceeding the first reference value, i.e. in Step S207 corresponding to point H in FIG. 8.

Also in the motor control device according to the third embodiment, it becomes possible to add the backlash correction amount to the position command for the motor 20 at the appropriate timing, and to add the backlash acceleration amount to the speed command or torque command for the motor 20 at the appropriate timing, similarly to the motor control devices according to the first and second embodiments.

Fourth Embodiment

Figure 9A:
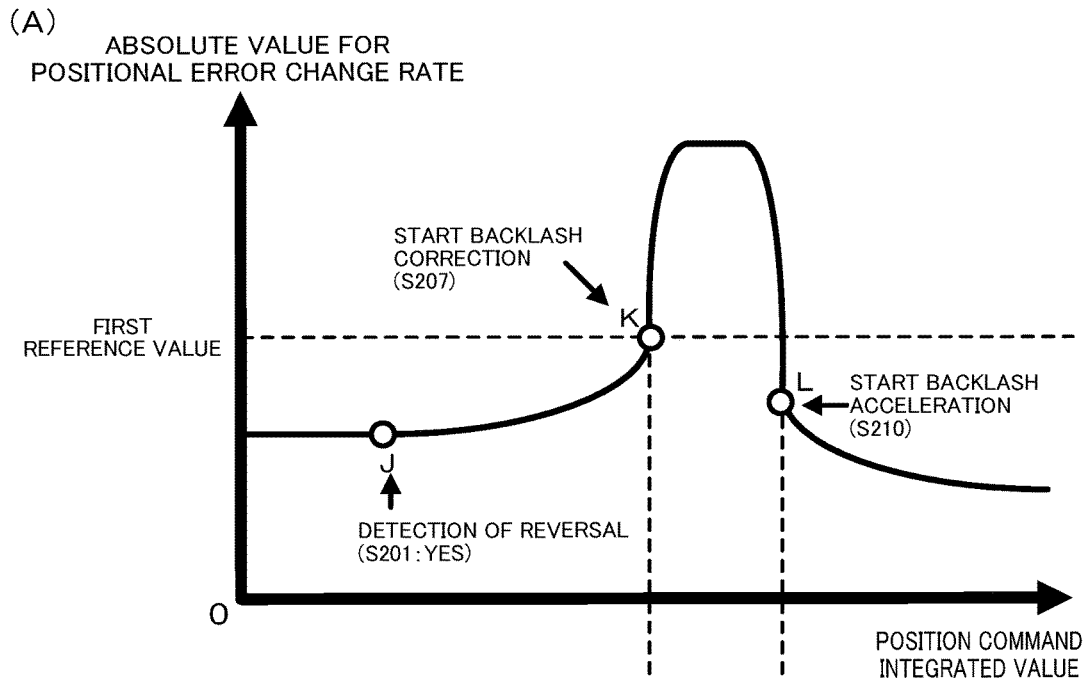
FIGS. 9A and 9B graphs showing the timing of backlash correction and backlash acceleration of the motor control device according to the fourth embodiment of the present invention.
Figure 9B:
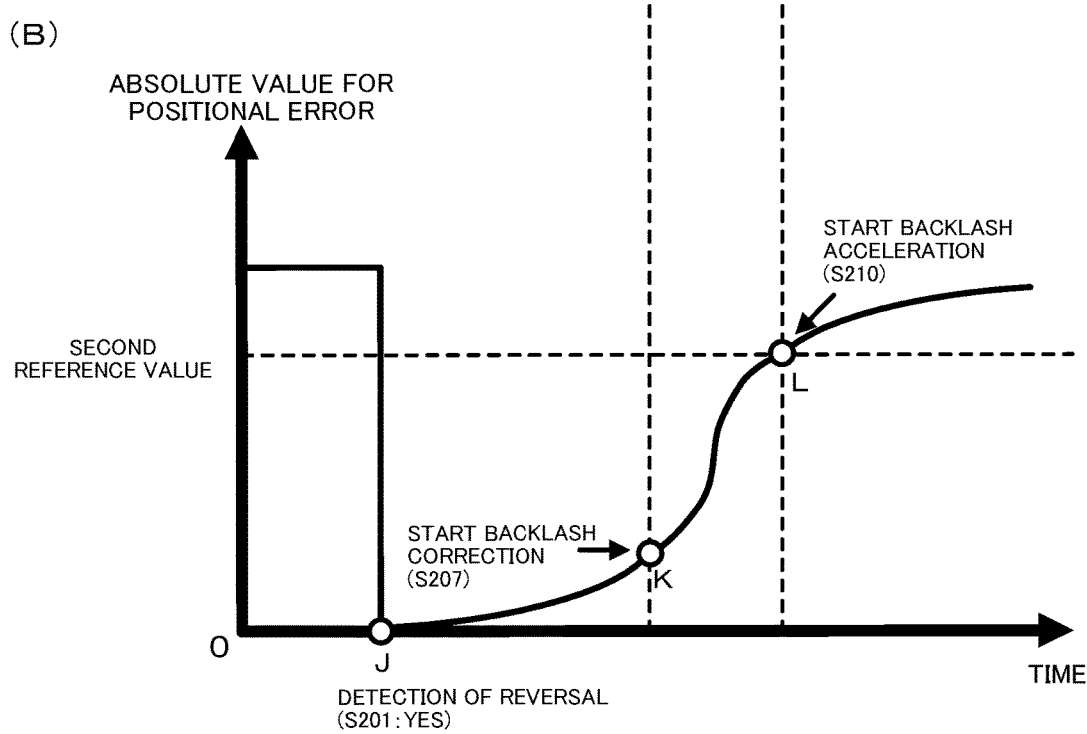

FIG. 9A is a graph showing the change in absolute value for the change rate of the positional error and the timing of backlash correction, upon the first determination part 208A of the motor control device according to the fourth embodiment comparing the absolute value for the change rate in this positional error with a reference value. In addition, FIG. 9B is a graph showing the successive change in the absolute value for the variation of the positional error and the timing of backlash acceleration, upon the second determination part 208B comparing the absolute value for the variation of the positional error with the second reference value. It should be noted that, since the motor control device according to the fourth embodiment is the same configuration as the motor control device 10A according to the second embodiment and the motor control device according to the third embodiment, explanations thereof will be omitted. In addition, since the operation flow of the motor control device according to the fourth embodiment is also basically identical to the motor control device 10A according to the second embodiment and the motor control device according to the third embodiment, explanation thereof will be omitted.

In the second embodiment, the absolute value for the change rate of the positional error per unit time is compared with the predetermined reference value. In addition, in the third embodiment, the absolute value for the change rate of the positional error per unit variation of motor revolution angle is compared with the predetermined reference value. On the other hand, in the fourth embodiment, the absolute value for the change rate of the positional error per unit variation in the integrated value of the position command is compared with a predetermined reference value. For this reason, the horizontal axis in FIG. 9A is the position command integrated value.

Similarly to FIGS. 7 and 8, the absolute value for the change rate increases after detecting reversal at point J corresponding to Step S201 also in FIG. 9; however, the backlash correction part 109 adds the backlash correction amount to the position command, at the stage of exceeding the first reference value, i.e. in Step S207 corresponding to point K in FIG. 9.

Also in the motor control device according to the fourth embodiment, it becomes possible to add the backlash correction amount to the position command for the motor 20 at the appropriate timing, and to add the backlash acceleration amount to the speed command or torque command for the motor 20 at the appropriate timing, similarly to the motor control devices 10, 10A according to the first to third embodiments.

Fifth Embodiment

Figure 10:
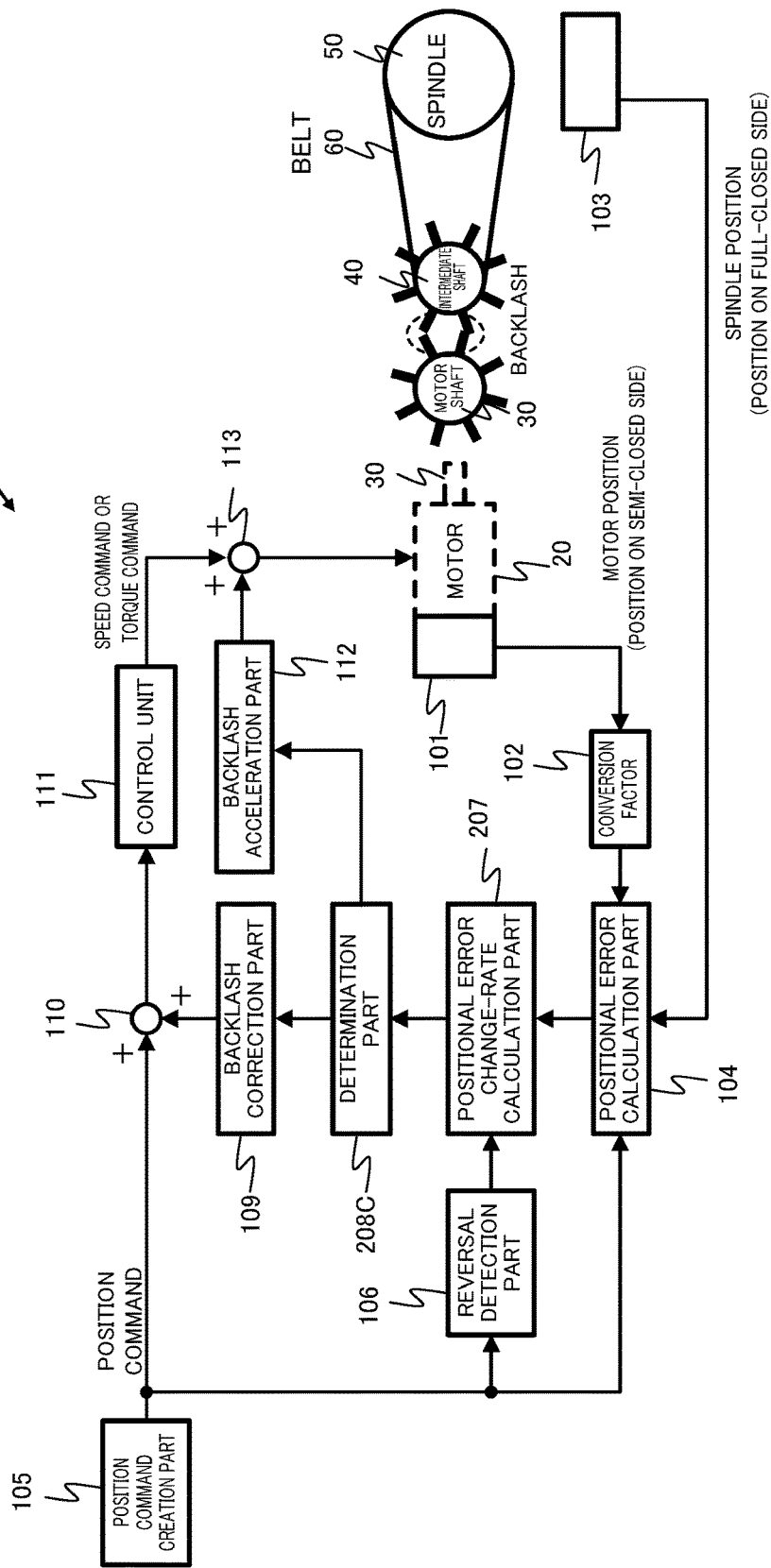
FIG. 10 is a view showing the configuration of a motor control device according to a fifth embodiment of the present invention.

FIG. 10 is a view showing the configuration of a motor control device 10B according to a fifth embodiment. It should be noted that the same reference symbols are used for constituent elements that are the same as the motor control device 10 according to the first embodiment, and specific explanations thereof will be omitted.

The motor control device 10B according to the fifth embodiment differs in the point of including the positional error change-rate calculation part 207 in place of the positional error variation calculation part 107 of the motor control device 10 according to the first embodiment. In addition, in the motor control device 10 according to the first embodiment, the determination part 108 mediates between the positional error variation calculation part 107, and the backlash correction part 109 and backlash acceleration part 112. On the other hand, in the motor control device 10B according to the fifth embodiment, a determination part 208C mediates between the positional error change-rate calculation part 207, and the backlash correction part 109 and backlash acceleration part 112. Furthermore, the motor control device according to the first embodiment sets the backlash correction to ON in the case of the variation of positional error exceeding the first reference value, and sets the backlash acceleration to ON in the case of exceeding the second reference value. On the other hand, the motor control device 10B according to the fifth embodiment sets the backlash correction to ON in the case of the change rate of positional error exceeding the first reference value, and sets the backlash acceleration to ON upon exceeding the second reference value and falling below the third reference value.

Figure 11:
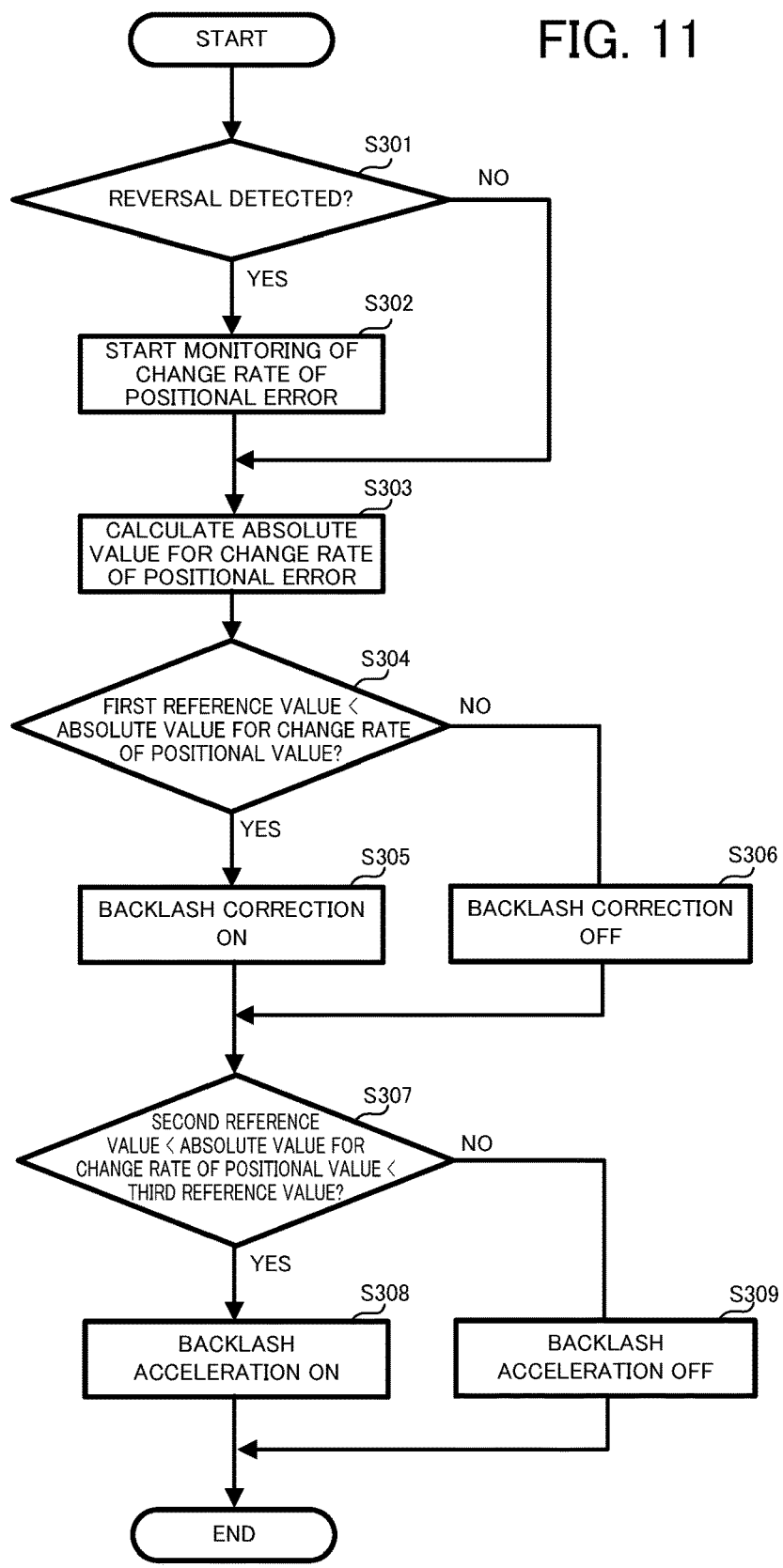
FIG. 11 is a flowchart showing processing of the motor control device according to the fifth embodiment of the present invention.

Next, although partially repeating, the operation flow of the above-mentioned motor control device 10B will be explained using FIG. 11.

First, the reversal detection part 106 monitors for reversal of the position command created by the position command creation part 105 (Step S301). In the case of reversal being detected (S301: YES), the positional error change-rate calculation part 207 starts monitoring of the change rate per unit time of the positional error (Step S302). Then, the positional error change-rate calculation part 207 calculates the absolute value for the change rate per unit time of the positional error (Step S303). On the other hand, in the case of reversal of the position command not being detected (S301: NO), rather than passing through the step of monitoring initialization of S302 again, the positional error change-rate calculation part 207 calculates the absolute value for the change rate of the positional error.

Next, the determination part 208C compares the absolute value for the variation of the above-mentioned positional error with the first reference value (Step S304). In the case of this absolute value exceeding the first reference value (S304: YES), the backlash correction part 109 adds the backlash correction amount to the position command. In other words, the motor control device 10B sets the backlash correction to ON (Step S305). In the case of the above-mentioned absolute value not exceeding the first reference value (S304: NO), the backlash correction part 109 does not add the backlash correction amount to the position command. In other words, the motor control device 10B sets the backlash correction to OFF (Step S306).

Next, the determination part 208C compares the absolute value for the change rate of the above-mentioned positional error with the second reference value and third reference value (Step S307). In the case of this absolute value exceeding the second reference value, and falling below the third reference value (S307: YES), the backlash acceleration part 112 adds the backlash acceleration amount to the speed command or torque command. In other words, the motor control device 10B sets the backlash acceleration to ON (Step S308). In the case of the above-mentioned absolute value not exceeding the second reference value (S307: NO), the backlash acceleration part 112 adds the backlash acceleration amount to the speed command or torque command. In other words, the motor control device 10B sets the backlash acceleration to OFF (Step S309).

FIG. 12 is a graph showing the successive change in the absolute value for the change rate of the positional error, and the timing of backlash correction and backlash acceleration, upon the determination part 208C comparing the absolute value for the change rate of the positional error with predetermined reference values. Although the absolute value for the change rate of the positional error is increasing after detecting reversal at point M which corresponds to Step S301, the backlash acceleration part 112 adds the backlash acceleration amount to the speed command or torque command at a stage exceeding the second reference value, i.e. in Step S308 corresponding to point N in FIG. 12. Subsequently, the backlash acceleration part 112 ends the addition of the backlash acceleration amount to the speed command or torque command, at the stage at which the absolute value for the change rate of the positional error becomes equal to the third reference value, i.e. in Step S309 corresponding to point O in FIG. 12. Also after this, although the absolute value for the change rate of the positional error is increasing, the backlash correction part 109 starts the addition of the backlash correction amount to the position command, at the stage exceeding the first reference value, i.e. in Step S305 corresponding to point P in FIG. 12. Subsequently, although the absolute value for the change rate of the positional error shifts to decline, the backlash acceleration part 112 starts the addition of the backlash acceleration amount to the speed command or torque command again, at the stage falling below the third reference value, i.e. in Step S308 corresponding to point Q in FIG. 12. Afterwards, at the stage at which the absolute value for the change rate of the positional error becomes equal to the second reference value, i.e. in Step S309 corresponding to point R in FIG. 12, the backlash acceleration part 112 ends the addition of the backlash acceleration amount to the speed command or torque command.

Also in the motor control device according to the fifth embodiment, it becomes possible to add the backlash correction amount to the position command for the motor 20 at the appropriate timing, and to add the backlash acceleration amount to the speed command or torque command for the motor 20 at the appropriate timing, similarly to the motor control devices according to the first to fourth embodiments.

Although embodiments of the present invention have been explained above, the present invention is not to be limited to the aforementioned embodiments. In addition, the effects described in the present embodiments are merely listing the most preferred effects produced from the present invention, and the effects according to the present invention are not to be limited to those described in the present embodiments.

The control method by the motor control devices 10, 10A is realized by way of software. In the case of being realized by software, the programs constituting this software are installed to a computer (motor control device 10, 10A, 10B). In addition, these programs may be distributed to users by being recorded on removable media, or may be distributed by being downloaded to the computer of the user via a network. Furthermore, these programs may be provided to the computer (motor control device 10, 10A, 10B) of the user as a Web service via a network without being downloaded.

EXPLANATION OF REFERENCE NUMERALS 10, 10A, 10B motor control device
20 motor
30 motor shaft (movable part)
35 motor shaft gear
40 intermediate shaft
45 intermediate shaft gear
50 spindle (driven part)
60 belt
101 first position detection part
102 conversion factor
103 second position detection part
104 positional error calculation part
105 position command creation part
106 reversal detection part
107 positional error variation calculation part
108 determination part
109 backlash correction part
110 adder
111 control unit
112 backlash acceleration part
113 adder
207 positional error change-rate calculation part
208A first determination part
208B second determination part
208C determination part
351 tooth
352 tooth
451 tooth

What is claimed is:

1. A motor control device for correcting backlash between a movable part that is driven by a motor, and a driven part that is driven by the movable part, the device comprising:
a first position detection part that detects a first position which is a position of the movable part;
a second position detection part that detects a second position which is a position of the driven part;
a positional error calculation part that calculates positional error, which is deviation between a converted first position detected value arrived at by converting a first position detected value detected by the first position detection part into a value of a position of the driven part according to a rotation ratio between the movable part and the driven part; and a second position detected value detected by the second position detection part;
a position command creation part that creates a position command;
a reversal detection part that detects reversal of the position command;
a positional error variation calculation part that calculates an absolute value for variation of the positional error since reversal was detected;
a determination part that determines whether the absolute value for the variation of the positional error has exceeded a predetermined reference value;
a backlash correction part that adds a backlash correction amount to the position command based on the positional error;
a control unit that calculates a speed command or a torque command from a position command after the backlash correction amount was added; and
a backlash acceleration part that adds a backlash acceleration amount to the speed command or the torque command,
wherein the backlash correction part starts addition of the backlash correction amount if an absolute value for variation of the positional error exceeds a first reference value designated in advance, and the backlash acceleration part starts addition of the backlash acceleration amount if the absolute value for the variation of the positional error exceeds a second reference value designated in advance.

2. The motor control device according to claim 1, wherein the movable part driven by the motor and the driven part driven by the movable part are mechanically joined by combination of gears and a belt.

3. A method for controlling a motor that corrects for backlash between a movable part that is driven by a motor and a driven part that is driven by the movable part, the method comprising the steps executed by a computer of:
detecting a first position which is a position of the movable part;
detecting a second position which is a position of the driven part;
calculating a positional error which is a deviation between a converted first position detected value arrived at by converting a first position detected value that was detected in the step of detecting a first position into a value of a position of the driven part according to a rotation ratio between the movable part and the driven part, and a second position detected value that was detected in the step of detecting a second position;
creating a position command;
detecting reversal of the position command;
calculating an absolute value for variation of the positional error since reversal was detected;
determining whether the absolute value for the variation of the positional error has exceeded a predetermined reference value;
adding a backlash correction amount to the position command based on the positional error;

calculating a speed command or a torque command from a position command to which the backlash correction amount was added; and adding a backlash acceleration amount to the speed command or the torque command, wherein addition of the backlash correction amount to the position command is started if the absolute value for the variation of the positional error exceeds a first reference value designated in advance, and addition of the backlash acceleration amount to the speed command or the torque command is started if the absolute value for the variation of the positional error exceeds a second reference value designated in advance.

4. A non-transitory computer readable medium recording a motor control program for correcting backlash between a movable part that is driven by a motor and a driven part that is driven by the movable part, the program enabling a computer to execute the steps of:

detecting a first position which is a position of the movable part;

detecting a second position which is a position of the driven part;

calculating a positional error which is a deviation between a converted first position detected value arrived at by converting a first position detected value that was detected in the step of detecting a first position into a value of a position of the driven part according to a rotation ratio between the movable part and the driven part, and a second position detected value that was detected in the step of detecting a second position;

creating a position command;

detecting reversal of the position command;

calculating an absolute value for variation of the positional error since reversal was detected;

determining whether the absolute value for the variation of the positional error has exceeded a predetermined reference value;

adding a backlash correction amount to the position command based on the positional error;

calculating a speed command or a torque command from a position command to which the backlash correction amount was added; and adding a backlash acceleration amount to the speed command or the torque command, wherein addition of the backlash correction amount to the position command is started if the absolute value for the variation of the positional error exceeds a first reference value designated in advance, and addition of the backlash acceleration amount to the speed command or the torque command is started if the absolute value for the variation of the positional error exceeds a second reference value designated in advance.

* * * * *